United States Patent
Kellum et al.

(10) Patent No.: US 12,478,594 B2
(45) Date of Patent: Nov. 25, 2025

(54) METHODS OF TREATMENT OF KIDNEY INJURY ASSOCIATED WITH INFECTION OR TRAUMA

(71) Applicant: University of Pittsburgh—Of the Commonwealth System of Higher Education, Pittsburgh, PA (US)

(72) Inventors: John A. Kellum, Pittsburgh, PA (US); Neil Hukriede, Allison Park, PA (US); Xiaoyan Wen, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 934 days.

(21) Appl. No.: 17/614,191

(22) PCT Filed: Jun. 1, 2020

(86) PCT No.: PCT/IB2020/055182
§ 371 (c)(1),
(2) Date: Nov. 24, 2021

(87) PCT Pub. No.: WO2020/240524
PCT Pub. Date: Dec. 3, 2020

(65) Prior Publication Data
US 2022/0226266 A1    Jul. 21, 2022

Related U.S. Application Data

(60) Provisional application No. 62/958,424, filed on Jan. 8, 2020, provisional application No. 62/854,654, filed on May 30, 2019.

(51) Int. Cl.
*A61K 31/167* (2006.01)
*A61P 13/12* (2006.01)

(52) U.S. Cl.
CPC ............ *A61K 31/167* (2013.01); *A61P 13/12* (2018.01)

(58) Field of Classification Search
CPC ........ A61K 31/167; A61P 13/12; A61P 31/00; A61P 43/00
See application file for complete search history.

(56) References Cited

U.S. PATENT DOCUMENTS

| | | | |
|---|---|---|---|
| 9,670,236 B2 | 6/2017 | Hukriede et al. | |
| 10,160,705 B2 | 12/2018 | Day et al. | |
| 10,160,715 B2 | 12/2018 | Swager et al. | |
| 10,233,201 B2 | 3/2019 | Hukriede et al. | |
| 2015/0246939 A1* | 9/2015 | Hukriede | A61P 13/12 564/162 |

FOREIGN PATENT DOCUMENTS

| WO | 2012109527 A2 | 8/2012 |
|---|---|---|
| WO | 2014071000 A1 | 5/2014 |

OTHER PUBLICATIONS

Skrypnyk et. al. (Am. J. Physiol. Renal Physiol., 310, F705-716) (Year: 2016).*
Nolan et. al. (J. Am. Soc. Nephrol, 9(4), 710-718) (Year: 1998).*
Zheng et. al. (J. Surg. Res., 192, 163-169) (Year: 2014).*
Prasad et. al. (Indian J Nephrol. 30, 161-165, Epub May 13, 2020) (Year: 2020).*
Tungsanga et. al. (Prevention of Chronic Kidney Disease and Its Complications in Older Adults, Drugs & Aging, 41:565-576) (Year: 2024).*
Walther et. al. (Adv. Drug Deliv. Rev., 65-77) (Year: 2017).*
Skyrpynyk et. al. (Am. J. Physiol. Renal Physiol, 310, F705-F716 (Year: 2016).*
Brewster et al., "Cyclodextrins as pharmaceutical solubilizers", 2007, Adv Drug Deliv. Rev., vol. 59, pp. 645-666.
Brilli et al., "HDAC inhibitors in kidney development and disease", 2013, Pediatr Nephrol., vol. 28(10), pp. 1909-1921.
Cavanaugh et al., "Urine Sediment Examination in the Diagnosis and Management of Kidney Disease: Core Curriculum 2019", 2019, Am J Kidney Dis., vol. 73(2), pp. 258-272.
Devy et al., "Selective Inhibition of Matrix Metalloproteinase-14 Blocks Tumor Growth, Invasion, and Angiogenesis", 2009, Cancer Res., vol. 69(4), pp. 1517-1526.
Haines et al., "Acute Kidney Injury in Trauma Patients Admitted to Critical Care: Development and Validation of a Diagnostic Prediction Model", 2018, Sci Rep., vol. 8:3665, pp. 1-9.
Higashi et al., "Molecular design of a highly selective and strong protein inhibitor against matrix metalloproteinase-2 (MMP-2)", 2013, J Biol Chem., vol. 288(13), pp. 9066-9076.
Kaneko et al., "Selective Inhibition of Membrane Type 1 Matrix Metalloproteinase Abrogates Progression of Experimental Inflammatory Arthritis: Synergy With Tumor Necrosis Factor Blockade", 2016, Arthritis Rheumatol., vol. 68(2), pp. 521-531.
Kellum et al., "Sepsis-Associated Acute Kidney Injury: A Problem Deserving of New Solutions", 2019, Nephron, vol. 143(3), pp. 174-178.
Loftsson et al., "Self-Association of Cyclodextrins and Cyclodextrin Complexes", 2004, J Pharm Sci., vol. 93(5), pp. 1091-1099.
Loftsson et al., "Cyclodextrins in drug delivery", 2005, Expert Opin Drug Deliv., vol. 2(2), pp. 335-351.
Mehta et al., "Acute Kidney Injury Network: report of an initiative to improve outcomes in acute kidney injury", 2007, Critical Care, vol. 11(2).

(Continued)

*Primary Examiner* — Jeffrey H Murray
*Assistant Examiner* — Daniel John Burkett
(74) *Attorney, Agent, or Firm* — The Webb Law Firm

(57) ABSTRACT

Provided herein is a method of treating kidney injury associated with trauma or infection, such as in sepsis-associated acute kidney injury in a patient including administering to the patient an amount of a histone deacetylase inhibitor effective to treat kidney injury associated with trauma or infection in a patient, beginning either between greater than 48 hours and two weeks after the insult leading to the trauma or infection, or after initial inflammation following the trauma or infection has decreased, and prior to development of irreversible fibrosis in the kidney.

15 Claims, 12 Drawing Sheets

Specification includes a Sequence Listing.

(56) References Cited

OTHER PUBLICATIONS

Rasheed et al., "Cyclodextrins as Drug Carrier Molecule: A Review", 2008, Sci Pharm., vol. 76, pp. 567-598.
Reichsoellner et al., "Clinical evaluation of multiple inflammation biomarkers for diagnosis and prognosis for patients with systemic inflammatory response syndrome", 2014, J Clin Microbiol., vol. 52(11), pp. 4063-4066.
"Remington: The Science and Practice of Pharmacy", 2005, Lippincott Williams & Wilkins, 21st edition, Chapters. 37, 39, 40, 41, 42, and 45.
Sela-Passwell et al., "Antibodies targeting the catalytic zinc complex of activated matrix metalloproteinases show therapeutic potential", 2012, Nature Medicine, vol. 18(1), pp. 143-147.
Thurman et al., "Recent advances in renal imaging", 2018, F1000Research, vol. 29(7), pp. 1-13.
Xu et al., "Inhibition of MMP-2 gelatinolysis by targeting exodomain-substrate interactions", 2007, Biochem J., vol. 406 (1), pp. 147-155.
Rittirsch et al., "Immunodesign of experimental sepsis by cecal ligation and puncture", Nat Protoc., 2009, pp. 31-36, vol. 4.
Hyslop et al., "Methods for sample preparation for direct immunoassay measurement of analytes in tissue homogenates: ELISA assay of amyloid beta-peptides", Current Protocols in Neuroscience, 2002, John Wiley & Sons, Inc., Hoboken, New Jersey, USA, pp. 1-12, Chap. 7.

\* cited by examiner

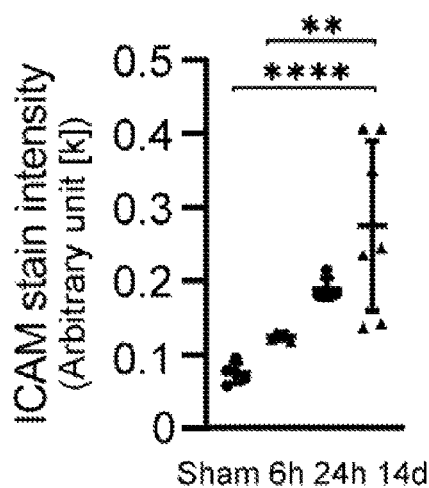
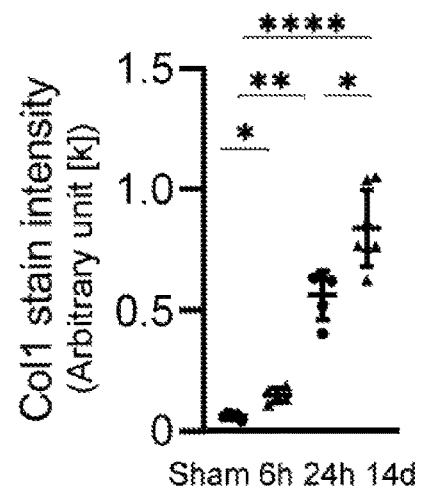
Fig. 1A        Fig. 1B
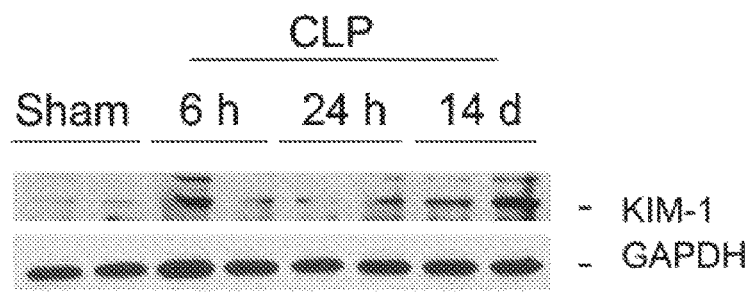
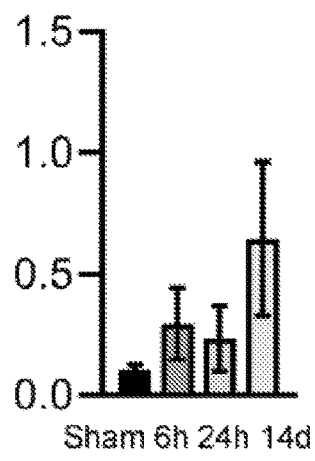
Fig. 1C

SEQUENCE LISTING

```
<160> NUMBER OF SEQ ID NOS: 28

<210> SEQ ID NO 1
<211> LENGTH: 21
<212> TYPE: DNA
<213> ORGANISM: Artificial Sequence
<220> FEATURE:
<223> OTHER INFORMATION: PCR Primer

<400> SEQUENCE: 1
gcctctcgta catacagacg c                                            21

<210> SEQ ID NO 2
<211> LENGTH: 21
<212> TYPE: DNA
<213> ORGANISM: Artificial Sequence
<220> FEATURE:
<223> OTHER INFORMATION: PCR Primer

<400> SEQUENCE: 2
ccagttctgc tttggatcag c                                            21

<210> SEQ ID NO 3
<211> LENGTH: 25
<212> TYPE: DNA
<213> ORGANISM: Artificial Sequence
<220> FEATURE:
<223> OTHER INFORMATION: PCR Primer

<400> SEQUENCE: 3
taggactcaa ccgtaatatc ccgac                                        25

<210> SEQ ID NO 4
<211> LENGTH: 25
<212> TYPE: DNA
<213> ORGANISM: Artificial Sequence
<220> FEATURE:
<223> OTHER INFORMATION: PCR Primer

<400> SEQUENCE: 4
aagagcagca gatcaccaga ttaac                                        25

<210> SEQ ID NO 5
```

```
<210> SEQ ID NO 5
<211> LENGTH: 25
<212> TYPE: DNA
<213> ORGANISM: Artificial Sequence
<220> FEATURE:
<223> OTHER INFORMATION: PCR Primer

<400> SEQUENCE: 5
ggtatgcttg atctgtatct gccac                                          25

<210> SEQ ID NO 6
<211> LENGTH: 25
<212> TYPE: DNA
<213> ORGANISM: Artificial Sequence
<220> FEATURE:
<223> OTHER INFORMATION: PCR Primer

<400> SEQUENCE: 6
cctcgactcc tacatcttct gagtt                                          25

<210> SEQ ID NO 7
<211> LENGTH: 21
<212> TYPE: DNA
<213> ORGANISM: Artificial Sequence
<220> FEATURE:
<223> OTHER INFORMATION: PCR Primer

<400> SEQUENCE: 7
acttggacag caacagggac a                                              21

<210> SEQ ID NO 8
<211> LENGTH: 20
<212> TYPE: DNA
<213> ORGANISM: Artificial Sequence
<220> FEATURE:
<223> OTHER INFORMATION: PCR Primer

<400> SEQUENCE: 8
gggctcctta tctgggcagc                                                20

<210> SEQ ID NO 9
<211> LENGTH: 26
<212> TYPE: DNA
<213> ORGANISM: Artificial Sequence
<220> FEATURE:
<223> OTHER INFORMATION: PCR Primer

<400> SEQUENCE: 9
gtcaagctca tttcctggta tgacaa                                         26

<210> SEQ ID NO 10
<211> LENGTH: 22
<212> TYPE: DNA
<213> ORGANISM: Artificial Sequence
<220> FEATURE:
<223> OTHER INFORMATION: PCR Primer

<400> SEQUENCE: 10
ggatagggcc tctcttgcta gt                                             22

<210> SEQ ID NO 11
<211> LENGTH: 22
<212> TYPE: DNA
<213> ORGANISM: Artificial Sequence
<220> FEATURE:
<223> OTHER INFORMATION: PCR Primer

<400> SEQUENCE: 11
```

```
gtgatgctca ggtatccatc ca                                          22

<210> SEQ ID NO 12
<211> LENGTH: 21
<212> TYPE: DNA
<213> ORGANISM: Artificial Sequence
<220> FEATURE:
<223> OTHER INFORMATION: PCR Primer

<400> SEQUENCE: 12
cacagttctc aaagcacagc g                                           21

<210> SEQ ID NO 13
<211> LENGTH: 25
<212> TYPE: DNA
<213> ORGANISM: Artificial Sequence
<220> FEATURE:
<223> OTHER INFORMATION: PCR Primer

<400> SEQUENCE: 13
ctggttgtta ctgaagagcc catac                                       25

<210> SEQ ID NO 14
<211> LENGTH: 25
<212> TYPE: DNA
<213> ORGANISM: Artificial Sequence
<220> FEATURE:
<223> OTHER INFORMATION: PCR Primer

<400> SEQUENCE: 14
cttaactgtc cttggttggt tcctc                                       25

<210> SEQ ID NO 15
<211> LENGTH: 20
<212> TYPE: DNA
<213> ORGANISM: Artificial Sequence
<220> FEATURE:
<223> OTHER INFORMATION: PCR Primer

<400> SEQUENCE: 15
aaaccagaga ttcccacacg                                             20

<210> SEQ ID NO 16
<211> LENGTH: 20
<212> TYPE: DNA
<213> ORGANISM: Artificial Sequence
<220> FEATURE:
<223> OTHER INFORMATION: PCR Primer

<400> SEQUENCE: 16
gtcgtgggtc ttcctgtagc                                             20

<210> SEQ ID NO 17
<211> LENGTH: 20
<212> TYPE: DNA
<213> ORGANISM: Artificial Sequence
<220> FEATURE:
<223> OTHER INFORMATION: PCR Primer

<400> SEQUENCE: 17
ccacagcatg gacgaattca                                             20

<210> SEQ ID NO 18
<211> LENGTH: 20
<212> TYPE: DNA
```

```
<213> ORGANISM: Artificial Sequence
<220> FEATURE:
<223> OTHER INFORMATION: PCR Primer

<400> SEQUENCE: 18
agcttgcttt gtggccttca                                              20

<210> SEQ ID NO 19
<211> LENGTH: 19
<212> TYPE: DNA
<213> ORGANISM: Artificial Sequence
<220> FEATURE:
<223> OTHER INFORMATION: PCR Primer

<400> SEQUENCE: 19
gatcttcagc cccgatgga                                               19

<210> SEQ ID NO 20
<211> LENGTH: 20
<212> TYPE: DNA
<213> ORGANISM: Artificial Sequence
<220> FEATURE:
<223> OTHER INFORMATION: PCR Primer

<400> SEQUENCE: 20
caagggttgc tctggcttgt                                              20

<210> SEQ ID NO 21
<211> LENGTH: 20
<212> TYPE: DNA
<213> ORGANISM: Artificial Sequence
<220> FEATURE:
<223> OTHER INFORMATION: PCR Primer

<400> SEQUENCE: 21
ggaggcatgt tcggtagtgg                                              20

<210> SEQ ID NO 22
<211> LENGTH: 19
<212> TYPE: DNA
<213> ORGANISM: Artificial Sequence
<220> FEATURE:
<223> OTHER INFORMATION: PCR Primer

<400> SEQUENCE: 22
ccctgcgttg gatttcgtg                                               19

<210> SEQ ID NO 23
<211> LENGTH: 25
<212> TYPE: DNA
<213> ORGANISM: Artificial Sequence
<220> FEATURE:
<223> OTHER INFORMATION: PCR Primer

<400> SEQUENCE: 23
gatgttcgtt tctggtggaa attgg                                        25

<210> SEQ ID NO 24
<211> LENGTH: 25
<212> TYPE: DNA
<213> ORGANISM: Artificial Sequence
<220> FEATURE:
<223> OTHER INFORMATION: PCR Primer

<400> SEQUENCE: 24
taaagcagaa agacatgagc ttccc                                        25
```

```
<210> SEQ ID NO 25
<211> LENGTH: 23
<212> TYPE: DNA
<213> ORGANISM: Artificial Sequence
<220> FEATURE:
<223> OTHER INFORMATION: PCR Primer

<400> SEQUENCE: 25
cactgccaag tatggttaca agt                                              23

<210> SEQ ID NO 26
<211> LENGTH: 22
<212> TYPE: DNA
<213> ORGANISM: Artificial Sequence
<220> FEATURE:
<223> OTHER INFORMATION: PCR Primer

<400> SEQUENCE: 26
ggttgttctg gtcaagtagc at                                               22

<210> SEQ ID NO 27
<211> LENGTH: 21
<212> TYPE: DNA
<213> ORGANISM: Artificial Sequence
<220> FEATURE:
<223> OTHER INFORMATION: PCR Primer

<400> SEQUENCE: 27
ttcggccttt ccagataacg c                                                21

<210> SEQ ID NO 28
<211> LENGTH: 21
<212> TYPE: DNA
<213> ORGANISM: Artificial Sequence
<220> FEATURE:
<223> OTHER INFORMATION: PCR Primer

<400> SEQUENCE: 28
actccgtcag caggaatggg c                                                21
```

METHODS OF TREATMENT OF KIDNEY INJURY ASSOCIATED WITH INFECTION OR TRAUMA

CROSS REFERENCE TO RELATED APPLICATIONS

This application is the United States national phase of International Application No. PCT/IB2020/055182, filed Jun. 1, 2020, and claims the benefit of U.S. Provisional Patent Application No. 62/854,654, filed May 30, 2019 and U.S. Provisional Patent Application No. 62/958,424, filed Jan. 8, 2020, each of which is incorporated herein by reference in its entirety.

STATEMENT REGARDING FEDERAL FUNDING

This invention was made with government support under Grant No. DK069403, awarded by the National Institutes of Health. The government has certain rights in the invention.

REFERENCE TO A SEQUENCE LISTING

The Sequence Listing associated with this application is filed in electronic format via EFS-Web and is hereby incorporated by reference into the specification in its entirety. The name of the text file containing the Sequence Listing is 6527_2104992_ST25.txt. The size of the text file is 5,605 bytes, and the text file was created on Nov. 24, 2021.

Sepsis, a systemic inflammatory response to infection, is the foremost precipitant of acute kidney injury (AKI), with sepsis-associated acute kidney injury (S-AKI) recognized as having distinct pathophysiology. The epidemiology of S-AKI may also be distinct in that most patients have S-AKI at presentation or shortly thereafter, limiting therapeutic options. Sepsis-associated acute kidney injury (S-AKI) results in a 3-5-fold increase in the risk of hospital mortality compared to sepsis alone. Patients with severe SARS-CoV-2 infections (Coronavirus disease 19 or COVID-19) also exhibit AKI. Tissue injury from major surgery, trauma or burn also releases damage-associated molecules which may cause AKI through mechanisms similar to S-AKI. Development of therapies to reverse S-AKI could therefore significantly affect sepsis outcomes. Post-translational histone acetylation plays a key role in regulating epigenetic gene expression in several biological processes. Histone deacetylase inhibitors (HDIs) are small molecules that promote the acetylation of histones and non-histone proteins by inhibiting the activity of HDAC enzymes, and exhibit potent anti-inflammatory and anti-fibrosis activities in a variety of in vivo model systems. While HDIs show promise in treatment of certain kidney injury models, new treatments for sepsis-induced, or trauma-induced kidney injury are desired.

SUMMARY

A method of treating kidney injury associated with trauma or infection in a patient comprising administering to the patient an amount of a histone deacetylase inhibitor effective to treat kidney injury associated with trauma or infection in a patient, beginning either: between greater than 24 hours and two weeks, greater than 48 hours and two weeks, or between 72 hours and one week after the insult leading to the trauma or infection, or after initial inflammation following the trauma or infection has decreased, and prior to development of irreversible fibrosis in the kidney.

The following numbered clauses describe various aspects, embodiments, or examples of the present invention.

Clause 1: A method of treating kidney injury associated with trauma or infection in a patient comprising administering to the patient an amount of a histone deacetylase inhibitor effective to treat kidney injury associated with trauma or infection in a patient, beginning either:
  between greater than 24 hours and two weeks, greater than 48 hours and two weeks, or between 72 hours and one week after the insult leading to the trauma or infection, or
  after initial inflammation following the trauma or infection has decreased, and prior to development of irreversible fibrosis in the kidney.

Clause 2: The method of clause 1, wherein the histone deacetylase inhibitor is administered starting from 48 hours to two weeks after the insult leading to the trauma or infection.

Clause 3: The method of clause 1 or 2, wherein the histone deacetylase inhibitor is UPHD-186.

Clause 4: The method of clause 1 or 2, wherein the histone deacetylase inhibitor is UPHD-25.

Clause 5: The method of clause 1 or 2, wherein the HDI is UPHD-29, UPHD-28, UPHD-34, UPHD-51, UPHD-67, UPHD-30, UPHD-22, UPHD-47, UPHD-48, UPHD-49, UPHD-53, UPHD-77, UPHD-146, UPHD-149, UPHD-150, UPHD-151, UPHD-152, UPHD-153, UPHD-154, UPHD-155, UPHD-156, UPHD-158, UPHD-161, UPHD-162, UPHD-168, UPHD-170, UPHD-171, UPHD-174, UPHD-175, UPHD-176, UPHD-178, UPHD-179, UPHD-180, UPHD-181, UPHD-185, UPHD-188, UPHD-189, UPHD-190, UPHD-191, UPHD-192, UPHD-193, UPHD-194, UPHD-195, UPHD-196, UPHD-197, UPHD-198, UPHD-199, UPHD-201, UPHD-202, UPHD-203, UPH-D-00204, UPHD-206, UPHD-207, UPHD-208, UPHD-209, UPHD-210, UPHD-211, UPHD-212, UPHD-222, UPHD-223, UPHD-224, UPHD-225, UPHD-226, UPHD-227, or UPHD-228, or a pharmaceutically acceptable salt of any of the preceding.

Clause 6: The method of any one of clauses 1-5, wherein the patient has sepsis.

Clause 7: The method of any one of clauses 1-6, wherein the patient has sepsis-associated acute kidney injury.

Clause 8: The method of any one of clauses 1-7, wherein the insult leading to the trauma or infection is an infection.

Clause 9: The method of clause 8, wherein the infection is a hospital-acquired infection (e.g., a nosocomial infection).

Clause 10: The method of any one of clauses 1-6, wherein the patient has COVID-19-associated acute kidney injury.

Clause 11: The method of clause 1, wherein the histone deacetylase inhibitor is administered after initial inflammation following the trauma or infection has decreased, and prior to development of irreversible fibrosis in the kidney.

Clause 12. The method of clause 11, wherein the histone deacetylase inhibitor is administered starting from 24 hours to two weeks after the insult leading to the trauma or infection.

Clause 12: A histone deacylase inhibitor for use in treating kidney injury associated with trauma or infection in a patient when administered to a patient in an amount effective to treat kidney injury associated with trauma or infection in a patient, beginning either: between greater than 48 hours and two weeks, or between 72 hours and one week after the insult leading to the trauma or infection, or after initial inflammation following the trauma or infection has decreased, and prior to development of irreversible fibrosis in the kidney.

BRIEF DESCRIPTION OF THE DRAWINGS

FIGS. 1A-1D. SA-AKI Non-Recovery and Treatment Timing A pro-fibrotic S-AKI outcome at 2 weeks post the initial insult. Sepsis was induced by cecal ligation and puncture surgery (CLP) and the renal expressions of injury markers were shown. FIGS. 1A and 1B: expression intensities for group animals (mean±SD, N=6-7). Scale bar=30 µm. FIGS. 1C and 1D: Blots of kidney injury marker expressions and the corresponding intensities of the blots. Tukey's test was used to determine the statistical significances. *P<0.05, P<0.01, *P<0.001, ****P<0.0001. KIM-1 results are for illustrative purposes. Abbreviations: KIM-1, kidney injury molecule-1; BMPR1A, bone morphogenetic protein receptor type 1A; αSMA, alpha smooth muscle actin. GAPDH, Glyceraldehyde 3-phosphate-dehydrogenase.

FIGS. 2A and 2B: Serial charts of the circulating interleukin 6 (IL6) and creatinine are shown (mean±SD, N=3-5) *P<0.05, ***P<0.001 compared to #. FIGS. 2C and 2D: Representative images of immune stain for NGAL in the kidneys (scale bar=20 µm) and the expression intensities for group each group of animals (mean±SD, N=15). FIG. 2E: Blots of renal time serial NGAL and the corresponding intensities of the blots. FIG. 2F: Schematic diagram of treatment timing and sample collection plan. Tukey's test was used to determine the statistical significance; t test was used for two group comparison. Abbreviations: NGAL: neutrophil gelatinase-associated lipocalin; hps, hours post-CLP surgery; i.p., intraperitoneal injection; dpt, days post-UPHD186 treatment.

FIG. 3A-3C: Dot plots of F4/80$^+$ MNC cell numbers per field, the stain intensities of iNOS$^+$ and MR$^+$ colocalized with F4/80$^+$ for group animals (mean±SD, N=7~12). Tukey's test was used to determine statistical significance. FIG. 3D: Heat map of renal mRNA expressions of inflammation and matrix remodeling mediator markers (N=6~8). *P<0.05, **P<0.01 compared to the CLP+vehicle group. Abbreviations: iNOS, inducible Nitric oxide synthases; F4/80, also known as EMR1, EGF-like module-containing mucin-like hormone receptor-like 1; MR, mannose receptor. nfkb, Nuclear Factor Kappa B; ccl10, C—C Motif Chemokine Ligand 20; icam, intercellular adhesion molecule; traf, tumor necrosis factor receptor associated factor; kim1, also known as HAVCR1, Hepatitis A Virus Cellular Receptor 1; lox, lysyl oxidase; loxl1, lysyl oxidase homolog 1.

FIG. 5A. Kaplan-Meier survival curves. Animals dying prior to treatment (at 48 or 96 h) are shown as "drop-off". More animals died prior to the 96 h time point and thus all comparisons are between UPHD186 and vehicle and not across treatment regimens. FIG. 5B. Circulating creatinine measured at 15 min before initiation of treatment (before Trt), one day after the 7-day treatment session (after Trt), and the endpoint. FIG. 5C. A heat map of renal mRNA expressions of the fibrosis proliferation markers (N=9~12). *P<0.05, **P<0.01 compared to the CLP+vehicle group. FIGS. 5d and 5E. Dot plots of fibrosis positive stain area % and renal tubule injury scores for group animals (mean±SD, N=7~13). FIG. 5F. Dot plots of IGFBP-7 stain areas % for group animals (mean SD, N=7~13). FIG. 5G. Linear regression plot of renal IGFBP-7 and collagen volume %. Equation Y=0.2*X+19.1, $R^2$=0.04, P=0.15. To calculate statistical significance, differences of survival rates were analyzed using log-rank Mantel-Cox test; Tukey's test was used for multiple group differences. NS, no statistical difference; *P<0.05, P<0.01, *P<0.001. Sham groups were pooled when comparable. Abbreviations: IGFBP7, insulin-like growth factor-binding protein 7; cdkn1a, cyclin-dependent kinase inhibitor 1a; ki67, Ki-67; plod2, procollagen-lysine, 2-oxoglutarate 5-dioxygenase 2; fsp1, fibroblast-specific protein 1; col1a1, collagen type I alpha 1 chain.

DETAILED DESCRIPTION

Figure 1D:
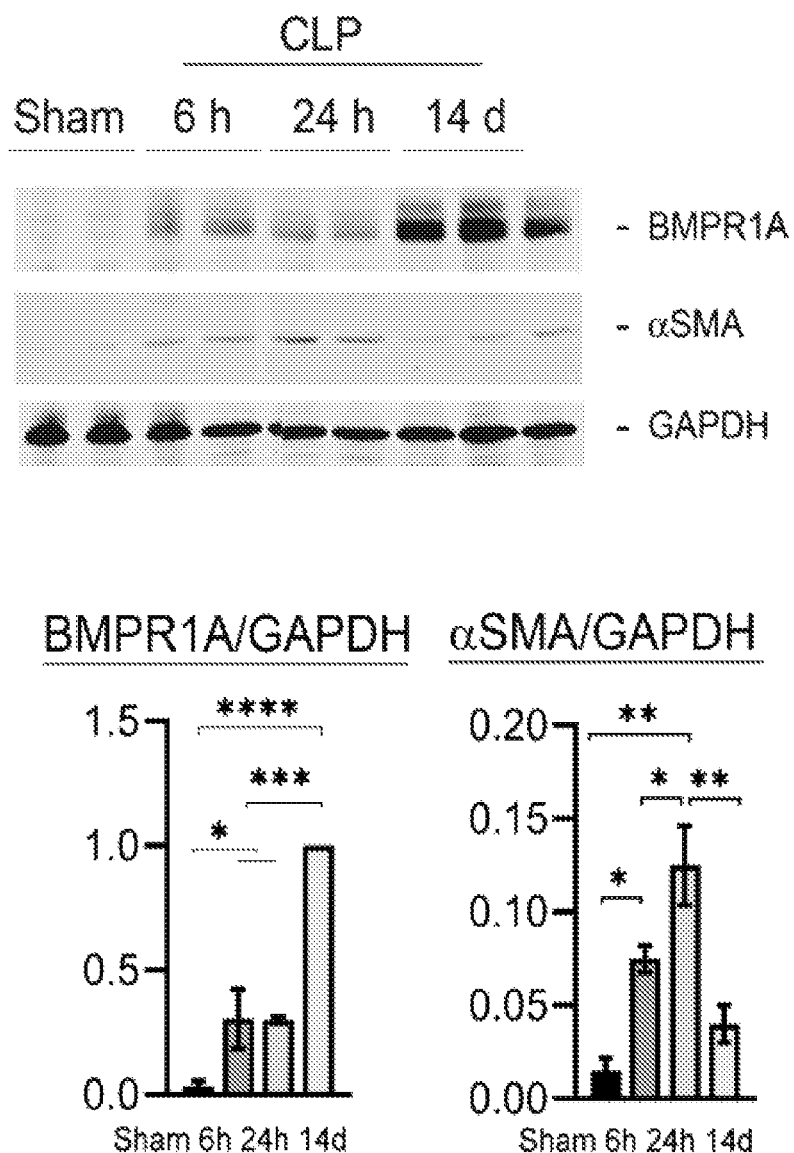

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values. For definitions provided herein, those definitions refer to word forms, cognates and grammatical variants of those words or phrases. "Comprising" and like terms are open-ended. The terms "a" and "an" refer to one or more.

As used herein, the term "patient" refers to members of the animal kingdom including but not limited to human beings and implies no relationship between a doctor or veterinarian and a patient.

Provided herein is a method of treating kidney injury in a patient associated with infection, or following surgery, trauma or burn e.g., sepsis-associated kidney injury. The method comprises administering to the patient an amount of a histone deacetylase inhibitor (HDI) effective to treat the patient, e.g., improve one or more symptoms, clinical criterion, or other indicia or improved kidney function. The treatment of the patient with the HDI begins after an initial inflammation stage in the patient with the infection or injury and before irreversible fibrosis occurs in the kidney. In one aspect, the treatment begins greater than 24 hours, greater than 48 hours or at least 72 or 96 hours after initial injury or infection (initial insult), and less than one week or less than two weeks after initial insult. The initial insult can be an infection or an injury, such as an infection resulting in sepsis, trauma, severe trauma, such as accidental trauma, surgery, burns, or dying tissue, such as with an ischemic event or rhabdomyolysis. The initial insult may be a coronavirus infection, such as COVID-19, which can result in AKI. The initial insult may be a hospital-acquired infection (e.g., a nosocomial infection). The patient may have sepsis, and may have sepsis-associated kidney injury.

An HDI is administered to patients in the methods provided herein. Examples of HDI's include, without limitation: Vorinostat (SAHA), Romidepsin (FK288), Chidamide, Panobinostat (LBH589), Belinostat (PXD101), Valproic acid, Tacedinaline (C1994), Mocetinostat, Abexinostat (PC124781), Etinostat (MS275-SNDX-275), Practinostat (SB939), Resminostat (4SC201), Givinostat (IFT2357), Quisinostat (JNJ-26481585), HBI-8000, Kevetrin, CUDC-101, AR42, Tefinostat (CHR-2845), CHR-3996, 4SC202, CG200745, Rocilinostat (ACY1215), and ME-344.

Additional HDI's, including UPHD or VNK-I compounds, such as UPHD-186:

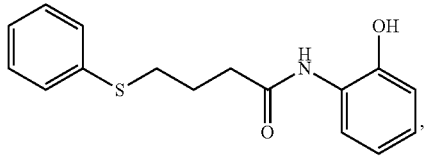

are disclosed in International Patent Application Publication Nos. WO 2012/109527 and WO 2014/071000, and U.S. Pat. Nos. 9,670,236, 10,160,715, and 10,233,201, each of which is incorporated herein by reference in its entirety.

The HDI may have the structure:

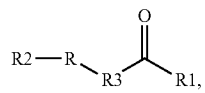

in which

R is S, S(O), S(O)$_2$ or NH,

R1 is —NH—R4 where R4 is OH, aminophenyl, hydroxyphenyl, C$_{1-4}$ alkyl hydroxyphenyl or phenyl hydroxyphenyl, or —O—R5 where R5 is H or C$_{1-4}$ alkyl, R2 is phenyl; substituted phenyl;

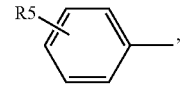

where R5 is halo; C$_{1-4}$ alkyl, methyl; methoxy, C$_{1-4}$ alkoxy; naphthyl; 1H-1,3-benzodiazol-2-yl; 1,3-benzothiazol-2-yl; pyrimidinyl, 1-methyl-1H-1,3benzodiazol-2-yl; pyridyl; methoxyphenyl; or methylthiophenyl, and R3 is from 0 to 5 methylene groups ((—CH$_2$—)$_{0-5}$) and 0 or 1 phenylene wherein at least one methylene or phenylene is present, or a pharmaceutically acceptable salt thereof, other than 4-(phenylthio)butanoic acid (PTBA, also 4-(phenylsulfanyl) butanoic acid). In one example, R is S. R3 is an aliphatic alkylene, such as —CH$_2$—CH$_2$—CH$_2$—, —CH$_2$—CH$_2$—CH$_2$—CH$_2$— or —CH$_2$—CH$_2$—CH$_2$—CH$_2$—CH$_2$— that may include one phenylene group (i.e., 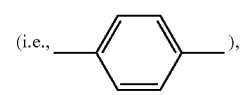), for example, R3 can be;

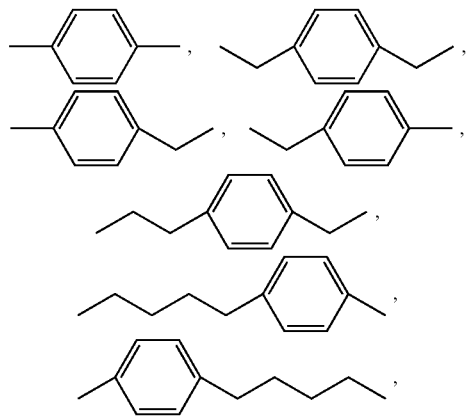

The HDI may have the structure:

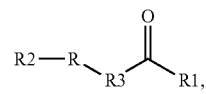

in which

R is O, S, S(O), S(O)$_2$, P(O)(CH$_3$), or P(O)(OCH$_3$),

R1 is methoxy or —NHR4 where R4 is OH, aminophenyl, hydroxyphenyl, hydroxypyridinyl, aminopyridinyl, alkyl hydroxypyridinyl, haloalkyl hydroxyphenyl, R2 is phenyl, benzyl, 4-methoxybenzyl, phenylethyl, substituted phenyl,

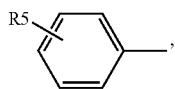

where R5 is 3-hydroxyl; methylthio; methylsulfonyl, methylsulfinyl; acetyl; 2-acetato; 3-acetato; carbamoyl, methyl carbamoyl, and R3 is —CH$_2$—CH$_2$—CH$_2$—, —CH$_2$—CH$_2$—CH$_2$—CH$_2$—, or —CH$_2$—CH$_2$—CH$_2$—CH$_2$—CH$_2$—, wherein when R is S(O), S(O)$_2$, R2 is benzyl, phenylethyl, or methylsulfonylphenyl;

and when R is S, either
(a) R1 is —NHR4 where R4 is hydroxypyridinyl, aminopyridinyl, alkyl hydroxypyridinyl, haloalkyl hydroxyphenyl;
(b) R1 is NHR4 where R4 is hydroxyphenyl or aminophenyl, and R2 is substituted phenyl,

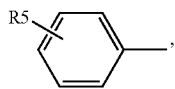

where R5 is 4-acetato; or (c) R2 is benzyl, phenylethyl, 4-methoxybenzyl, substituted phenyl,

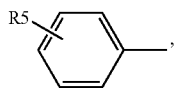

where R5 is 3-hydroxyl; acetyl; 2-acetato; 3-acetato; carbamoyl, methyl carbamoyl, or a pharmaceutically acceptable salt thereof.

Specific examples of useful compounds may include:
UPHD-20, 4-(phenylthio)butanoic acid (PTBA);
UPHD-21 (VNK-I-284), methyl 4-[(4-chlorophenyl)sulfanyl]butanoate;
UPHD-22 (VNK-I-286), methyl 4-[(4-methoxyphenyl)sulfanyl]butanoate;
UPHD-23 (VNK-I-276), N-hydroxy-4(phenylsulfanyl)butanamide;
UPHD-24, propyl 4-(phenylsulfanyl)butanoate;
UPHD-25, methyl 4-(phenylsulfanyl)butanoate (m4PTB);
UPHD-26 (VNK-I-285), methyl 4-[(4-methylphenyl)sulfanyl]butanoate;
UPHD-27 (VNK-I-287), 4-[(4-chlorophenyl)sulfanyl]-N-hydroxybutanamide;
UPHD-28 (VNK-I-305), N-hydroxy-4-[(4-methylphenyl)sulfanyl]butanamide;
UPHD-29 (VNK-I-294), 4-[(4-fluorophenyl)sulfanyl]-N-hydroxybutanamide;
UPHD-30 (VNK-I-291), methyl 4-[(4-fluorophenyl)sulfanyl]butanoate;
UPHD-32, methyl 5-[(4-fluorophenyl)sulfanyl]pentanoate;
UPHD-33, methyl 5-(phenylsulfanyl)pentanoate;
UPHD-34, 5-[(4-fluorophenyl)sulfanyl]-N-hydroxypentanamide;
UPHD-35, N-hydroxy-5-(phenylsulfanyl)pentanamide;
UPHD-36, N-(2-aminophenyl)-4-(phenylsulfanyl)butanamide;
UPHD-37, N-(2-aminophenyl)-5-[(4-fluorophenyl)sulfanyl]pentanamide;
UPHD-38, N-(2-aminophenyl)-5-(phenylsulfanyl)pentanamide;
UPHD-39, methyl 7-[(4-fluorphenyl)sulfanyl]heptanoate;
UPHD-40, methyl 7-(phenylsulfanyl)heptanoate;
UPHD-41, N-hydroxy-7-(phenylsulfanyl)heptanamide;
UPHD-42, 7-[(4-fluorophenyl)sulfanyl]-N-hydroxyheptanamide;
UPHD-43, N-(2-aminophenyl)-7-[(4-fluorophenyl)sulfanyl]heptanamide;
UPHD-44, N-(2-aminophenyl)-7-(phenylsulfanyl)heptanamide;
UPHD-45, methyl 4[(phenylsulfanyl)methyl]benzoate;
UPHD-46, methyl 4-{[(4-fluorophenyl)sulfanyl]methyl}benzoate;
UPHD-47, methyl 6-(phenylsulfanyl)hexanoate;
UPHD-48, methyl 6-[(4-fluorophenyl)sulfanyl]hexanoate;
UPHD-49, N-(2-aminophenyl)-6-(phenylsulfanyl)hexanamide;
UPHD-50, N-hydroxy-6-(phenylsulfanyl)hexanamide;
UPHD-51, 6-[(4-fluorophenyl)sulfanyl]-N-hydroxyhexanamide;
UPHD-52, N-hydroxy-4-[(phenylsulfanyl)methyl]benzamide;
UPHD-53, N-(2-aminophenyl)-6-[(4-fluorophenyl)sulfanyl]hexanamide;
UPHD-54, N-(2-aminophenyl)-4-[(phenylsulfanyl)methyl]benzamide;
UPHD-55, N-(2-aminophenyl)-4-([(4-fluorophenyl)sulfanyl]methyl)benzamide;
UPHD-56, ethyl 4-(phenylsulfanyl)benzoate;
UPHD-57, methyl 6-(naphthalen-2-ylsulfanyl)hexanoate;
UPHD-58, methyl 6-(pyrimidin-2-ylsulfanyl)hexanoate;
UPHD-59, N-hydroxy-6-(naphthalen-2-ylsulfanyl)hexanamide;
UPHD-60, N-(2-aminophenyl)-6-(naphthalen-2-ylsulfanyl)hexanamide;
UPHD-61, N-hydroxy-4-[2-(phenylsulfanyl)ethyl]benzamide;
UPHD-62, methyl 6-(1,3-benzothiazol-2-ylsulfanyl)hexanoate);
UPHD-63, methyl 6-(naphthalen-2-ylsulfonyl)hexanoate;
UPHD-64, N-(2-aminophenyl)-4-[2-(phenylsulfanyl)ethyl]benzamide;
UPHD-65, methyl 6-(pyridin-2-ylsulfanyl)hexanoate;
UPHD-66, N-(2-aminophenyl)-6-(naphthalene-2-sulfonyl)hexanamide;
UPHD-67, 4-{2[(4-fluorophenyl)sulfanyl]ethyl}-N-hydroxybenzamide;
UPHD-68, N-(2-aminophenyl)-4-{2-[(4-fluorophenyl)sulfanyl]ethyl}benzamide;
UPHD-69, N-hydroxy-6-(naphthalene-2-sulfonyl)hexanamide;
UPHD-70, 6-(1,3-benzothiazol-2-ylsulfanyl)-N-hydroxyhexanamide;
UPHD-71, N-(2-aminophenyl)-6-(1,3-benzothiazol-2-ylsulfanyl)hexanamide;
UPHD-72, N-(2-aminophenyl)-6-(pyrimidin-2-ylsulfanyl)hexanamide;
UPHD-73, N-(2-aminophenyl)-6-(pyridin-2-ylsulfanyl)hexanamide;
UPHD-74, N-hydroxy-6-(pyrimidin-2-ylsulfanyl)hexanamide;
UPHD-75, methyl 6-[(1-methyl-1H-1,3-benzodiazol-2-yl)sulfanyl]hexanoate;

UPHD-76, methyl 6-(1H-1,3benzodiazol-2-ylsulfanyl)hexanoate;
UPHD-77, 6-[(4-fluorophenyl)sulfanyl]-N-(2-hydroxyphenyl)hexanamide;
UPHD-81, N-(2-aminophenyl)-6-[(1-methyl-1H-1,3-benzodiazol-2-yl)sulfanyl]hexanamide;
UPHD-82, 6-[(4-fluorophenyl)sulfanyl]-N-(2-hydroxy-5-phenylphenyl)hexanamide;
UPHD-83, N-(5-tert-butyl-2-hydroxyphenyl)-6-[(4-fluorophenyl)sulfanyl]hexanamide;
UPHD-84, 6-[(4-fluorophenyl)sulfanyl]-N-(2-hydroxy-5-methylphenyl)hexanamide;
UPHD-85, N-hydroxy-6-[(1-methyl-1H-1,3benzodiazol-2-yl)sulfanyl]hexanamide;
UPHD-86, N-(2-hydroxyphenyl)-6-(pyrimidin-2-ylsulfanyl)hexanamide;
UPHD-87, N-(5-tert-butyl-2-hydroxyphenyl)-6-(pyrimidin-2-ylsulfanyl)hexanamide;
UPHD-88, methyl 6-[(3-fluorophenyl)sulfanyl]hexanoate;
UPHD-89, methyl 6-[(2-fluorophenyl)sulfanyl]hexanoate;
UPHD-90, methyl 6-[(4-methoxyphenyl)sulfanyl]hexanoate;
UPHD-91, methyl 6-(benzenesulfonyl)hexanoate;
UPHD-92, methyl 6-[(4-fluorobenzene)sulfonyl]hexanoate;
UPHD-93, methyl 4-[(4-methoxybenzene)sulfonyl]butanoate;
UPHD-94, methyl 4-[4-methyoxybenzene)sulfinyl]butanoate;
UPHD-95, 6-(1H-1,3-benzodiazol-2-ylsulfanyl)-N-(2-hydroxyphenyl)hexanamide;
UPHD-96, ethyl 4-[3-(phenylsulfanyl)propyl]benzoate;
UPHD-97, 4-[(4-methoxybenzene)sulfonyl]butanoic acid;
UPHD-100, methyl 6-[(3-methoxyphenyl)sulfanyl]hexanoate;
UPHD-101, methyl 6-[(2-methoxyphenyl)sulfanyl]hexanoate;
UPHD-104, N-(2-hydroxyphenyl)-6-(phenylsulfonyl)hexanamide;
UPHD-105, 6-[(4-fluorophenyl)sulfonyl]-N-(2-hydroxyphenyl)hexanamide;
UPHD-106, methyl 6-(phenylsulfinyl)hexanoate;
UPHD-107, methyl 6-[(4-fluorophenyl)sulfinyl]hexanoate;
UPHD-111, methyl 6-[(4-chlorophenyl)sulfanyl]hexanoate;
UPHD-112, methyl 6-[(2-chlorophenyl)sulfanyl]hexanoate;
UPHD-113, methyl 6-[(3-chlorophenyl)sulfanyl]hexanoate;
UPHD-114, 6-[(2-fluorophenyl)sulfanyl]-N-(2-hydroxyphenyl)hexanamide;
UPHD-115, 6-[(3-fluorophenyl)sulfanyl]-N-(2-hydroxyphenyl)hexanamide;
UPHD-118, 6-[(2-fluorophenyl)sulfanyl]-N-hydroxyhexanamide;
UPHD-119, 6-[(3-fluorophenyl)sulfanyl]-N-hydroxyhexanamide;
UPHD-121, N-(2-hydroxyphenyl)-6-[(2-methoxyphenyl)sulfanyl]hexanamide;
UPHD-122, N-(2-aminophenyl)-6-[(2-fluorophenyl)sulfanyl]hexanamide;
UPHD-123, N-(2-hydroxyphenyl)-6-[(3-methoxyphenyl)sulfanyl]hexanamide;
UPHD-124, N-(2-hydroxyphenyl)-6-[(4-methoxyphenyl)sulfanyl]hexanamide;
UPHD-125, N-(2-aminophenyl)-6-[(4-methoxyphenyl)sulfanyl]hexanamide;
UPHD-126, N-(2-aminophenyl)-6-[(3-methoxyphenyl)sulfanyl]hexanamide;
UPHD-127, 6-[(4-chlorophenyl)sulfanyl]-N-(2-hydroxyphenyl)hexanamide;
UPHD-128, N-(2-aminophenyl)-6-[(4-chlorophenyl)sulfanyl]hexanamide;
UPHD-129, N-(2-aminophenyl)-6-[(2-methoxyphenyl)sulfanyl]hexanamide;
UPHD-130, N-hydroxy-6-[(4-methoxyphenyl)sulfanyl]hexanamide;
UPHD-131, N-hydroxy-6-[(3-methoxyphenyl)sulfanyl]hexanamide;
UPHD-132, N-hydroxy-6-[(2-methoxyphenyl)sulfanyl]hexanamide;
UPHD-135, methyl 4-[(6-methoxy-6-oxohexyl)sulfanyl]benzoate;
UPHD-136, N-(2-aminophenyl)-6-[(3-fluorophenyl)sulfanyl]hexanamide;
UPHD-138, 6-[(3-chlorophenyl)sulfanyl]-N-(2-hydroxyphenyl)hexanamide;
UPHD-140, 6-(benzenesulfinyl)-N-(2-hydroxyphenyl)hexanamide;
UPHD-141, 6-(4-fluorobenzenesulfinyl)-N-(2-hydroxyphenyl)hexanamide;
UPHD-142, methyl 6-[(4-(methylsulfanyl)phenyl)sulfanyl]hexanoate;
UPHD-143, 6-[(4-fluorophenyl)sulfanyl]-N-hydroxyhexanamide;
UPHD-144, methyl 6-[(4-hydroxyphenyl)sulfanyl]hexanoate;
UPHD-145, N-(2-aminophenyl)-6-[(3-chlorophenyl)sulfanyl]hexanamide;
UPHD-146, methyl 6-[4-(methylsulfanyl)phenoxy]hexanoate;
UPHD-149, methyl 6-(4-methanesulfonylphenoxy)hexanoate;
UPHD-150, methyl 4-({5-[(2-hydroxyphenyl)carbamoyl]pentyl}sulfanyl)benzoate;
UPHD-151, methyl 4-({5-[(2-aminophenyl)carbamoyl]pentyl}sulfanyl)benzoate;
UPHD-152, methyl 3-[(6-methoxy-6-oxohexyl)sulfanyl]benzoate;
UPHD-153, methyl 2-[(6-methoxy-6-oxohexyl)sulfanyl]benzoate;
UPHD-154, methyl 6-[(3-hydroxyphenyl)sulfanyl]hexanoate;
UPHD-155, N-(2-hydroxyphenyl)-6-[4-(methylsulfanyl)phenoxy]hexanamide;
UPHD-156, N-(2-aminophenyl)-6-[4-(methylsulfanyl)phenoxy]hexanamide;
UPHD-157, N-(2-aminophenyl)-6-[(2-chlorophenyl)sulfanyl]hexanamide;
UPHD-158, methyl 6-[(2-hydroxyphenyl)sulfanyl]hexanoate;
UPHD-161, methyl 2-({5-[(2-hydroxyphenyl)carbamoyl]pentyl}sulfanyl)benzoate;
UPHD-162, methyl 6-(4-methanesulfinylphenoxy)hexanoate;
UPHD-164, 6-[(3-chlorophenyl)sulfanyl]-N-hydroxyhexanamide;
UPHD-165, 6-[(2-chlorophenyl)sulfanyl]-N-hydroxyhexanamide;
UPHD-166, 6-[(2-chlorophenyl)sulfanyl]-N-(2-hydroxyphenyl)hexanamide;
UPHD-168, methyl6-[(4-carbamoylphenyl)sulfanyl]hexanoate;
UPHD-170, methyl 2-({5-[(2-aminophenyl)carbamoyl]pentyl}sulfanyl)benzoate;
UPHD-171, methyl 6-{[4-(methylcarbamoyl)phenyl]sulfanyl}hexanoate;

UPHD-174, 6-{[3-(methylcarbamoyl)phenyl]sulfanyl}hexanoate;
UPHD-175, 4-({5-[(2-aminophenyl)carbamoyl]pentyl}sulfanyl)-N-methylbenzamide;
UPHD-176, 4-({5-[(2-hydroxyphenyl)carbamoyl]pentyl}sulfanyl)-N-methylbenzamide;
UPHD-178, methyl 5-(benzylsulfanyl)pentanoate;
UPHD-179, methyl 4-[(2-phenylethyl)sulfanyl]butanoate;
UPHD-180, methyl 5-{[(4-methoxyphenyl)methyl]sulfanyl}pentanoate;
UPHD-181, 3-({5-[(2-hydroxyphenyl)carbamoyl]pentyl}sulfanyl)-N-methylbenzamide;
UPHD-185, 3-({5-[(2-aminophenyl)carbamoyl]pentyl}sulfanyl)-N-methylbenzamide;
UPHD-186, N-(2-hydroxyphenyl)-4-(phenylsulfanyl)butanamide;
UPHD-187, N-(2-hydroxyphenyl)-6-(phenylsulfanyl)hexanamide;
UPHD-188, N-(2-aminophenyl)-5-(benzysulfanyl)pentanamide;
UPHD-189, N-(2-aminophenyl)-5-{[(4-methoxyphenyl)methyl]sulfanyl}pentanamide;
UPHD-190, N-(2-aminophenyl)-4-[(2-phenylethyl)sulfanyl]butanamide;
UPHD-191, 5-(benzylsulfanyl)-N-(2-hydroxyphenyl)pentanamide;
UPHD-192, N-(2-hydroxyphenyl)-5-{[(4-methoxyphenyl)methyl]sulfanyl}pentanamide;
UPHD-193, N-(2-hydroxyphenyl)-4-[(2-phenylethyl)sulfanyl]butanamide;
UPHD-194, N-hydroxy-5-{[(4-methoxyphenyl)methyl]sulfanyl}pentanamide;
UPHD-195, 5-(benzylsulfanyl)-N-hydroxypentanamide;
UPHD-196, N-hydroxy-4-[(2-phenylethyl)sulfanyl]butanamide;
UPHD-197, methyl 6-(4-methanesulfonylbenzenesulfonyl)hexanoate;
UPHD-198, N-(3-hydroxy-6-methylpyridin-2-yl)-4-(phenylsulfanyl)butanamide;
UPHD-199, methyl 6-[methoxy(phenyl)phosphoryl]hexanoate;
UPHD-201, methyl 5-phenylmethanesulfinylpentanoate;
UPHD-202, methyl 6{[2-(methylcarbamoyl)phenyl]sulfanyl}hexanoate;
UPHD-203, methyl 4-[methoxy(phenyl)phosphoryl'butanoate;
UPH-D-204, N-(3-hydroxy-6-methylpyridin-2-yl)-6-(phenylsulfanyl)hexanamide;
UPHD-206, methyl 5-phenylmethanesulfonylpentanoate;
UPHD-207, N-[2-hydroxy-5-(trifluoromethyl)phenyl]-6-(phenylsulfanyl)hexanamide;
UPHD-208, methyl 4-[methyl(phenyl)phosphoryl]butanoate;
UPHD-209, N-[2-hydroxy-5-(trifluoromethyl)phenyl]-4-(phenylsulfanyl)butanamide;
UPHD-210, N-(2-hydroxyphenyl)-6-[methyl(phenyl)phosphoryl]hexanamide;
UPHD-211, N-(2-aminopyridin-3-yl)-4-(phenylsulfanyl)butanamide;
UPHD-212, N-(4-hydroxypyridin-3-yl)-4-(phenylsulfanyl)butanamide;
UPHD-214, 2-[4-(phenylsulfanyl)butanamido]anilinium chloride;
UPHD-222, N-(2-hydroxypyridin-3-yl)-4-(phenylsulfanyl)butanamide;
UPHD-223, N-(3-hydroxypyridin-4-yl)-6-(phenylsulfanyl)hexanamide
UPHD-224, 2-({5-[(2-hydroxyphenyl)carbamoyl]pentyl}sulfanyl)-N-methylbenzamide;
UPHD-225, methyl 4-(2-phenylethanesulfinyl)butanoate;
UPHD-226, N-(3-aminopyridin-2-yl)-6-(phenylsulfanyl)hexanamide;
UPHD-227, N-(3-aminopyridin-2-yl)-4-(phenylsulfanyl)butanamide;
UPHD-228, N-(3-aminopyridin-2-yl)-4-(phenylsulfanyl)butanamide;
VNK-I-154, (1-methylpropyl)-4-(phenylsulfanyl)butanoate;
VNK-I-157, n-butyl-4-(phenylsulfanyl)butanoate;
VNK-I-259, 4-[phenylsulfanyl]-N-methylbutanamide;
VNK-I-289, 4-[(4-methoxyphenyl)sulfanyl]-N-hydroxybutanamide;
VNK-I-290, methyl-4-(4-(bromophenyl)sulfanyl)butanoate;
VNK-I-292, 4-[(4-bromophenyl)sulfanyl]-N-hydroxybutanamide;
VNK-I-298, methyl 4-(phenylamino)butanoate;
VNK-I-300, 4-(phenylamino)butanoic acid,
or a pharmaceutically acceptable salt of any off the preceding.

Specific examples of useful compounds may include: UPHD-29; UPHD-28; UPHD-34; UPHD-51; UPHD-67; UPHD-25; UPHD-30; UPHD-22; UPHD-47; UPHD-48; UPHD-49; UPHD-53; UPHD-77; UPHD-146, UPHD-149, UPHD-150, UPHD-151, UPHD-152, UPHD-153, UPHD-154, UPHD-155, UPHD-156, UPHD-158, UPHD-161, UPHD-162, UPHD-168, UPHD-170, UPHD-171, UPHD-174, UPHD-175, UPHD-176, UPHD-178, UPHD-179, UPHD-180, UPHD-181, UPHD-185, UPHD-186, UPHD-188, UPHD-189, UPHD-190, UPHD-191, UPHD-192, UPHD-193, UPHD-194, UPHD-195, UPHD-196, UPHD-197, UPHD-198, UPHD-199, UPHD-201, UPHD-202, UPHD-203, UPH-D-00204, UPHD-206, UPHD-207, UPHD-208, UPHD-209, UPHD-210, UPHD-211, UPHD-212, UPHD-222, UPHD-223, UPHD-224, UPHD-225, UPHD-226, UPHD-227, or UPHD-228, or a pharmaceutically acceptable salt of any off the preceding.

Pharmaceutically acceptable salts of any of the compounds described herein also may be used in the methods described herein. Pharmaceutically acceptable salt forms of the compounds described herein may be prepared by conventional methods known in the pharmaceutical arts, and include as a class veterinarily acceptable salts. For example and without limitation, where a compound comprises a carboxylic acid group, a suitable salt thereof may be formed by reacting the compound with an appropriate base to provide the corresponding base addition salt. Non-limiting examples include: alkali metal hydroxides, such as potassium hydroxide, sodium hydroxide and lithium hydroxide; alkaline earth metal hydroxides, such as barium hydroxide and calcium hydroxide; alkali metal alkoxides, such as potassium ethanolate and sodium propanolate; and various organic bases such as piperidine, diethanolamine, and N-methylglutamine.

Acid and base addition salts may be prepared by contacting the free base form with a sufficient amount of a desired acid or base to produce the salt in a manner known in the art. The free base may be regenerated by contacting the salt form with a base or acid (depending on the nature of the salt) and isolating the free base. The free base forms differ from their respective salt forms somewhat in certain physical properties such as solubility in polar solvents, but otherwise the salts are equivalent to their respective free base forms for purposes described herein.

Compounds comprising basic nitrogen-containing groups may be quaternized with such agents as $C_{1-4}$ alkyl halides, such as methyl, ethyl, iso-propyl and tert-butyl chlorides, bromides and iodides; $C_{1-4}$ alkyl sulfate such as dimethyl, diethyl and diamyl sulfates; $C_{10-18}$ alkyl halides, such as decyl, dodecyl, lauryl, myristyl and stearyl chlorides, bromides and iodides; and aryl-$C_{1-4}$ alkyl halides, such as benzyl chloride and phenethyl bromide. Such salts permit the preparation of both water-soluble and oil-soluble compounds.

Non-limiting examples of pharmaceutically-acceptable base salts include: aluminum, ammonium, calcium, copper, ferric, ferrous, lithium, magnesium, manganic, manganous, potassium, sodium, and zinc salts. Salts derived from pharmaceutically acceptable organic non-toxic bases include, without limitation: salts of primary, secondary, and tertiary amines, substituted amines including naturally occurring substituted amines, cyclic amines, and basic ion exchange resins, such as arginine, betaine, caffeine, chloroprocaine, choline, N,N'-dibenzylethylenediamine (benzathine), dicyclohexylamine, diethanolamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, iso-propylamine, lidocaine, lysine, meglumine, N-methyl-D-glucamine, morpholine, piperazine, piperidine, polyamine resins, procaine, purines, theobromine, triethanolamine, triethylamine, trimethylamine, tripropylamine, and tris-(hydroxymethyl)-methylamine (tromethamine).

Acid addition salts may be prepared by treating a compound with pharmaceutically acceptable organic and inorganic acids, including, without limitation: hydrohalides, such as hydrochloride, hydrobromide, hydroiodide; other mineral acids and their corresponding salts such as sulfates, nitrates, and phosphates; alkyl- and mono-arylsulfonates, such as ethanesulfonate, toluenesulfonate, and benzenesulfonate; and other organic acids and their corresponding salts, such as acetate, tartrate, maleate, succinate, citrate, benzoate, salicylate, and ascorbate.

Non-limiting examples of pharmaceutically-acceptable acid salts include: acetate, adipate, alginate, arginate, aspartate, benzoate, besylate (benzenesulfonate), bisulfate, bisulfite, bromide, butyrate, camphorate, camphorsulfonate, caprylate, chloride, chlorobenzoate, citrate, cyclopentanepropionate, digluconate, dihydrogenphosphate, dinitrobenzoate, dodecylsulfate, ethanesulfonate, fumarate, galacterate, galacturonate, glucoheptanoate, gluconate, glutamate, glycerophosphate, hemisuccinate, hemisulfate, heptanoate, hexanoate, hippurate, hydrochloride, hydrobromide, hydroiodide, 2-hydroxyethanesulfonate, iodide, isethionate, iso-butyrate, lactate, lactobionate, malate, maleate, malonate, mandelate, metaphosphate, methanesulfonate, methylbenzoate, monohydrogenphosphate, 2-naphthalenesulfonate, nicotinate, nitrate, oxalate, oleate, pamoate, pectinate, persulfate, phenylacetate, 3-phenylpropionate, phosphate, phosphonate, and phthalate.

Multiple salts forms are also considered to be pharmaceutically-acceptable salts. Common, non-limiting examples of multiple salt forms include: bitartrate, diacetate, difumarate, dimeglumine, diphosphate, disodium, and trihydrochloride.

As such, "pharmaceutically acceptable salt" as used herein is intended to mean an active ingredient (drug) comprising a salt form of any compound as described herein. The salt form may contribute to improved and/or desirable pharmacokinetic/pharmodynamic properties of the compounds described herein.

In use, any compound described herein, including pharmaceutically acceptable salts thereof, may be admixed with any pharmaceutically acceptable carrier or carriers, such as water, saline, physiological salt solutions, Ringer's solution or any other carrier customarily used for administration of drugs to the subject in question (see, generally, Troy, D B, Editor, Remington: The Science and Practice of Pharmacy, 21st Ed., Lippincott Williams & Wilkins (2005), pp. 745-849 for descriptions of various compositions, solutions, and dosage forms useful for administration of the described compounds, as well as methods of making such compositions, solutions, and dosage forms).

The compounds described herein may be formulated into a composition with one or more pharmaceutical vehicles or diluents for oral, intravenous or subcutaneous administration. The composition may be formulated in a classical manner using solid or liquid vehicles, diluents and additives appropriate to the desired mode of administration. Orally, the compounds may be administered in the form of tablets, capsules, granules, powders and the like.

An amount of a histone deacetylase inhibitor effective to treat kidney injury associated with trauma or infection in a patient refers to a dosage administered as a course of treatment, either once, or in multiple doses over a period of time. Irrespective of the course of treatment, as used herein, any agent or agents used for treating kidney injury associated with trauma or infection is administered in an amount effective to improve kidney function, to modulate histone deacetylase enzyme activations in a cell, to modulate cell cycle or cell numbers in certain cell cycle stage, to expand renal progenitor cells, to prevent fibrosis in the kidney, and/or to stimulate kidney repair in a patient, namely in an amount and in a dosage regimen effective to improve kidney function, to modulate histone deacetylase enzyme activations in a cell, to modulate cell cycle or cell numbers in certain cell cycle stage, to expand renal progenitor cells, to prevent fibrosis in the kidney, and/or to stimulate kidney repair in a patient in the patient. An effective dose may range from 0.05 to 200 mg/kg/day, or from 10 to 100 mg/kg/day, and in certain embodiments less than 100 mg/kg/day, including any increment or range therebetween, including, for example and without limitation: 0.1 mg/kg/day, 0.5 mg/kg/day, 1 mg/kg/day, 5 mg/kg/day, 10 mg/kg/day, 20 mg/kg/day, 25 mg/kg/day, 50 mg/kg/day, 75 mg/kg/day, 100 mg/kg/day. However, for each compound described herein, an effective dose or dose range is expected to vary from that of other compounds described herein for any number of reasons, including the molecular weight of the compound, bioavailability in the dosage form, route of administration, specific activity (e.g., $EC_{50}$), etc. The effective range (e.g., the therapeutic window) between the minimally-effective dose, and maximum tolerable dose in a patient can be determined empirically by a person of skill in the art, with end points being determinable by in vitro and in vivo assays, such as those described in U.S. Pat. Nos. 9,670,236, 10,160,715, and 10,233,201, and/or are acceptable in the pharmaceutical and medical arts for obtaining such information regarding agents, such as histone deacetylase inhibitors. Different concentrations of the agents described herein are expected to achieve similar results. Once treatment is initiated, the compounds may be administered orally one or more times daily, for example, two to four times daily, once every two, three, four, five or more days, weekly, monthly, etc., including increments therebetween. In certain delivery methods, it is possible to deliver the drug continuously, or substantially continuously as in the case of, for example, intravenous or transdermal delivery routes. A person of ordinary skill in the pharmaceutical and medical arts will appreciate that it will be a matter of design choice and/or optimization to identify a suitable dosage regimen for improve kidney function, to modulate histone deacetylase enzyme activations in a cell, to modulate cell cycle or cell numbers in certain cell cycle stage, to expand renal progenitor cells, to prevent fibrosis in the kidney, and/or to stimulate kidney repair in a patient based on the teachings provided herein.

Treatment is initiated after an initial "insult" occurs in a patient. An initial "insult" is an injury or initiation of infection. As part of the body's response to infection or trauma, such as accidental trauma, surgical trauma, burns, dying tissue, such as in ischemic events or rhabdomyolysis, infection, resulting in, e.g., a sepsis, including systemic inflammatory response syndrome, sepsis, severe sepsis, and septic shock, an initial inflammatory response occurs, which includes, for example and without limitation, elevated plasma interleukin-6, or tumor necrosis factor levels, among other markers of the initial inflammatory response, or a coronavirus infection, as in COVID-19, resulting in AKI. As shown herein, treatment of a patient with trauma- or infection-induced kidney injury with an HDI during the initial inflammatory response leads to negative outcomes, especially as compared to treatment with an HDI after the initial inflammatory response. The initial inflammatory response resolves after 48-72 hours in most patients, but may resolve as early as 24 hours. Treatment of a patient with trauma- or infection-induced kidney injury with an HDI after the initial inflammatory response leads to positive results, including improve kidney function, to modulate histone deacetylase enzyme activations in a cell, to modulate cell cycle or cell numbers in certain cell cycle stage, to expand renal progenitor cells, to prevent fibrosis in the kidney, and/or to stimulate kidney repair in a patient. At a certain point, typically at least one week or two weeks after initial injury or infection and kidney injury, irreversible fibrosis takes place, leading to loss of kidney function. As such, treatment of a patient with an HDI is initiated prior to irreversible fibrosis taking place. Generally, as indicated, treatment is initiated between 48 hours post-injury or infection, e.g., 72 hours or later after initial injury or infection, and within one week or within two weeks of initial injury or infection, but may be initiated earlier, such as 24 hours after initial injury or infection, depending on the patient's immune status.

In the case of a patient presenting in a doctor's office or emergency room, the precise timing of an initial insult may be estimated, or the timing of the end of initial inflammatory response to an injury or infection may be determined in any effective way, such as by clinical criterion.

The patients treated with the HDI according to the methods described herein have kidney injury and inflammation has ceased to evolve, substantially. A number of methods can be used to identify whether or not kidney injury has occurred, and if initial inflammatory response has ceased, including, without limitation: an increase of circulating creatinine level of at least 0.3 mg per dL (26.52 μmol per L) or at least from 1.5-fold to 2-fold from baseline; a reduction in urine output; the need for renal replacement therapy; biopsy, for example sublethal changes of epithelial cells including vacuolization, necrosis, detachment of renal tubular epithelial cells from the basement membrane, effacement and loss of brush border in proximal tubular segments, cast formation, tubular dilation, or interstitium accumulation of leukocytes, production of IL-6, TGFβ1, and/or NGAL by tubular epithelial cells as a measure of acute inflammation, e.g. as detected by staining; imaging, e.g., microbubbles-contrast enhanced renal ultrasound, functional MRI including dynamic contrast-enhanced magnetic resonance imaging (DCE-MRI), and blood oxygen level-dependent (BOLD) MRI detected renal function decline, targeting-conjugated-microbubbles for enhanced renal ultrasound, targeting-conjugated-superparamagnetic iron oxide (SPIO) enhanced MRI, and chemokine receptor CXCR4-targeted PET scan detected activated renal inflammation and leukocyte infiltrates; detectable urinary markers, such as TIMP2, IGBP7, or IL-18, or NGAL; or clinical criterion or indicia of active disease such as fever, rapid decline of kidney function, urine leukocytes and/or sediment findings, combined with increase of circulating fibronectin, interleukin-8 (IL-8), biotin, neutrophil gelatinase-associated lipocalin (NGAL), IL-6, C-reactive protein (CRP), procalcitonin (PCT), and/or soluble urokinase plasminogen activator receptor (suPAR).

The compounds described herein may be administered in any manner that is effective to improve kidney function, to modulate histone deacetylase enzyme activations in a cell, to modulate cell cycle or cell numbers in certain cell cycle stage, to expand renal progenitor cells, to prevent fibrosis in the kidney, and/or to stimulate kidney repair in a patient. Examples of delivery routes include, without limitation: topical, for example, epicutaneous, inhalational, enema, ocular, otic and intranasal delivery; enteral, for example, orally, by gastric feeding tube or swallowing, and rectally; and parenteral, such as, intravenous, intraarterial, intramuscular, intracardiac, subcutaneous, intraosseous, intradermal, intrathecal, intraperitoneal, transdermal, iontophoretic, transmucosal, epidural, and intravitreal, with oral or intravenous approaches being preferred for improved kidney function, to modulate histone deacetylase enzyme activations in a cell, to modulate cell cycle or cell numbers in certain cell cycle stages, to expand renal progenitor cells, to prevent fibrosis in the kidney, and/or to stimulate kidney repair in a patient.

Therapeutic/pharmaceutical compositions are prepared in accordance with acceptable pharmaceutical procedures, such as described in Remington: The science and Practice of Pharmacy, 21st edition, ed. Paul Beringer et al., Lippincott, Williams & Wilkins, Baltimore, MD Easton, Pa. (2005) (see, e.g., Chapters 37, 39, 41, 42, and 45 for examples of powder, liquid, parenteral, intravenous and oral solid formulations and methods of making such formulations).

Any of the compounds described herein may be compounded or otherwise manufactured into a suitable composition for use, such as a pharmaceutical dosage form or drug product in which the compound is an active ingredient. According to one example, the drug product described herein is an oral tablet, capsule, caplet, liquid-filled or gel-filled capsule, etc. Compositions may comprise a pharmaceutically acceptable carrier, or excipient. An excipient is an inactive substance used as a carrier for the active ingredients of a medication. Although "inactive," excipients may facilitate and aid in increasing the delivery, stability or bioavailability of an active ingredient in a drug product. Non-limiting examples of useful excipients include: antiadherents, binders, rheology modifiers, coatings, disintegrants, emulsifiers, oils, buffers, salts, acids, bases, fillers, diluents, solvents, flavors, colorants, glidants, lubricants, preservatives, antioxidants, sorbents, vitamins, sweeteners, etc., as are available in the pharmaceutical/compounding arts.

According to one non-limiting embodiment, the compounds described herein are complexed with a cyclodextrin. Cyclodextrins are compounds that have found substantial recognition as excipients (e.g., as carriers, vehicles, etc.) in the pharmaceutical field, for example in oral and intravenous dosage forms. Cyclodextrins are able form non-covalent inclusion complexes and/or aggregates in solution with poorly soluble drugs, for example, BCS Class II and IV drugs (high or low intestinal permeability, respectively, but low solubility in both instances). Cyclodextrins are cyclic oligosaccharides having a hydrophilic outer surface and a lipophilic central cavity. They consist of α-1,4-linked α-D-glucopyranose units. Naturally-occurring cyclodextrins include α-, β- and γ-cyclodextrins, with 6, 7 and 8 glucopyranose units, respectively. The natural cyclodextrins can be used orally or topically, but natural β-cyclodextrin and γ-cyclodextrin cannot be used parenterally. A number of cyclodextrin derivatives have been formulated with various usefulness in different administrative routes. Common, non-limiting examples of cyclodextrin derivatives include hydroxypropyl-β-cyclodextrin (e.g., 2-hydroxypropyl-β-cyclodextrin), hydroxypropyl-γ-cyclodextrin (e.g., 2-hydroxypropyl-γ-cyclodextrin), hydroxyethyl-β-cyclodextrin, randomly methylated β-cyclodextrin, methyl-β-cyclodextrin, dimethyl-β-cyclodextrin, permethylated β-cyclodextrin, sulfobutylether β-cyclodextrin (e.g., sodium salt), sulfobutyl-γ-cyclodextrin, branched cyclodextrin (e.g., glucosyl-β-cyclodextrin or maltosyl-β-cyclodextrin, e.g., 6-O-maltosyl-β-cyclodextrin or glucosyl-β-cyclodextrin) and randomly-acetylated amorphous-β-cyclodextrin. Cyclodextrins may be complexed with a drug as inclusion complexes (included) in a solution in a 1:1 molar ratio, though increased or decreases relative amounts of the drug or cyclodextrin may be used during formulation in order to drive the reaction. Where the drug is aggregated instead of included within the cyclodextrin, an excess of cyclodextrin may be utilized. It should be recognized that the inclusion or aggregation process can be optimized, including manipulation of relative cyclodextrin-to-active ingredient ratios to obtain optimal solubility and bioavailability or other desirable features of the end-product.

A complete description of the state of the art of the uses of cyclodextrins as pharmaceutical excipients is beyond the scope of this document. To this end, see, Loftsson et al. "Self-Association of Cyclodextrins and Cyclodextrin Complexes" J. Pharm. Sci. 93(5):1091-1099 (2004); Loftsson et al. "Cyclodextrins in Drug Delivery" Expert. Opin. Drug Deliv. 2:335-351 (2005); Brewster et al. "Cyclodextrins as Pharmaceutical Solubilizers" Advanced Drug Delivery Reviews 59:645-666 (2007); and Rasheed et al., "Cyclodextrins as Drug Carrier Molecule: A review" Sci. Pharm. 76:567-598 (2008) for their description of cyclodextrins and uses thereof in the pharmaceutical arts. As used herein, "a cyclodextrin" or "cyclodextrins" refer not only to naturally-occurring α-, β- and γ-cyclodextrins, but to cyclodextrin derivatives, including but not limited to those mentioned above. Likewise "α-cyclodextrin(s)", "β-cyclodextrin(s)" and "γ-cyclodextrins" refer both to the naturally-occurring cyclodextrin and to cyclodextrin derivatives (e.g., "a β-cyclodextrin" includes both β-cyclodextrin and β-cyclodextrin derivatives, such as, without limitation, hydroxypropyl-β-cyclodextrin, hydroxyethyl-β-cyclodextrin, randomly methylated β-cyclodextrin, methyl-β-cyclodextrin, dimethyl-β-cyclodextrin, permethylated β-cyclodextrin, sulfobutylether β-cyclodextrin, branched β-cyclodextrin, etc.).

EXAMPLES

Translation of therapies from preclinical studies into humans requires model systems that recapitulate clinical scenarios and the development of renal fibrosis indicative of the transition from acute to chronic kidney disease. Post-translational histone acetylation plays a key role in regulating epigenetic gene expression in several biological processes. Histone deacetylase inhibitors (HDIs) are small molecules that promote the acetylation of histones and non-histone proteins by inhibiting the activity of HDAC enzymes, and exhibit potent anti-inflammatory and anti-fibrosis activities in a variety of in vivo model systems. Emerging evidence indicate HDIs can promote renal recovery after nephrotoxic or ischemia-reperfusion injuries in both acute and chronic models. In particular, a new class of HDI, 4-(phenylthiol) butanoic acid (PTBA), facilitates renal recovery in various kidney injury models. However, as shown herein, PTBA therapy could be harmful in some forms of AKI if given too early, when injury is still ongoing. Conversely, therapies to promote repair may be ineffective if given too late, especially if fibrosis is already initiated.

Animal models of S-AKI are available in the literature, but none have been reported to include post-injury fibrotic gene-induction indicative of transition to CKD. A pro-fibrotic phenotype of S-AKI is demonstrated below in a mouse model of cecal ligation and puncture (CLP) by titrating kidney injury in aged Balb/c mice. The effects the PTBA prodrug UPHD-186 was investigated in our model by comparing kidney outcomes and molecular/histological features in early and delayed (based on kidney inflammation) UPHD-186-treated animals compared to vehicle.

Example 1

We describe below a model of sepsis-associated acute kidney injury (S-AKI) that leads to renal fibrosis in mice subjected to cecal-ligation and puncture. We then administrated a newly-identified histone deacetylase inhibitor (HDI), PTBA prodrug UPHD-186, to the model starting either before or after the resolution of renal inflammation to determine the possible mechanisms of S-AKI recovery. Early treatment was associated with increased expression of injury markers and adverse renal outcome, whereas delayed treatment had a positive effect on macrophages, epithelial phenotype differentiation and proliferation, which facilitated recovery and attenuated fibrosis. Our results illustrate the importance of time-dependent processes in resolution of injury and initiation of repair following S-AKI. We also show that, despite return of renal function, a pro-fibrotic phenotype can emerge, without appropriate treatment. Since patients with sepsis frequently present to medical attention after AKI has occurred, strategies that promote recovery are essential.

Here we characterized a Murine model of S-AKI induced by abdominal sepsis developing into a chronic kidney disease-like phenotype and examine treatment effects of UPHD186 on renal outcomes. Specifically, we applied UPHD186 either before (48 hrs from CLP) or after (96 hrs from CLP) the resolution of inflammation and renal dysfunction as shown by expression of circulating IL-6 (interleukin-6), renal neutrophil gelatinase-associated lipocalin (NGAL), and serum creatinine levels. We found that early treatment with UPHD186 further worsened kidney damage whereas delayed treatment improved survival and renal histology and decreased development of fibrosis. Our results are highly relevant to S-AKI in humans. We recently reported that, in patients admitted with a diagnosis of septic shock, 50% had clinical evidence and an additional 20% had biomarker-only evidence of AKI when they presented to medical attention (Kellum J A, Chawla L S, Keener C, Singbartl K, Palevsky P M, Pike F L, Yealy D M, Huang D T, Angus D C: The effects of alternative resuscitation strategies on acute kidney injury in patients with septic shock. American Journal of Respiratory and Critical Care Medicine 2016, 193(3):281-287). When comparing these patients with non-AKI, we found not only the in-hospital survival is highly associated with mitigation of S-AKI, long-term following-up (1-3 years) in these same patients and other similar populations (Fiorentino M, Tohme F A, Wang S, Murugan R, Angus D C, Kellum J A: Long-term survival in patients with septic acute kidney injury is strongly influenced by renal recovery. PLoS ONE 2018, 13(6):e0198269) has also shown that, regardless of the initial AKI staging, the extent of kidney recovery is a significant determinant of overall survival, emphasizing the importance of promoting recovery in S-AKI treatment.

Methods

Animals

Balb/c mice (20-24 weeks old, male and female, Charles River Labs) were used. Mice were subjected to cecal ligation and puncture surgery (CLP) in accordance with methods reported by Rittirsch et al. (Rittirsch D, Huber-Lang M S, Flierd M A, Ward P A: Immunodesign of experimental sepsis by cecal ligation and puncture. Nature protocols 2009, 4(1):31-36). Specifically, Sepsis was induced by ligating 1 cm length of the cecum from the apex and two punctures with a 25-Gauge needle. Animals in the sham group had only laparotomy without any cecal punctures. Post-surgery treatment included 40 mL/kg Ringer's solution after surgery, and ceftriaxone (25 mg/kg), metronidazole (12.5 mg/kg), and buprenorphine (0.05 mg/kg), every 12 hours administered intraperitoneally (i.p.) for 3 days. Septic animals were randomly divided into four groups to receive a seven-day UPHD186 (50 mg/kg/day, i.p.) or vehicle (20% Cyclodextrin-2% DMSO in PBS, i.p.) treatment, starting from 48 hours or 96 hours post-CLP. To determine treatment efficacy, time-serial blood samples (approx. 10 µL) were collected through animals' saphenous vein on the days before/after the treatment session. All mice were followed for survival and sacrificed at the 3rd day post-treatment or the endpoint day 14 to collect kidneys and blood samples.

Kidney Function and Enzyme-Linked Immunosorbent Assays

Plasma samples were collected via saphenous vein or cardiac-puncture method under deep terminal anesthesia. Samples were subjected to colorimetric or ELISA assays to determine the levels of creatinine (Sigma-Aldrich), TNFα, and IL6 (R&D Systems) according to the manufacturer's instructions.

Immunoblotting Analysis of Kidney Protein Expression

The right kidney was harvested immediately after euthanasia, and a quarter of the kidney was minced and digested using RIPA lysis buffer supplemented with 100 µg PMSF and 1 tablet of protease/phosphatase inhibitor (Thermo Fisher Scientific) per 10 ml buffer. After measuring concentrations using a modified DC™ protein assay, equal amounts of protein were loaded onto Criterion™ TGX™ precast gel, separated by electrophoresis, and then transferred to a nitrocellulose membrane (Bio-Rad Laboratories). After blocked 1 hour at room temperature (RT) in PBST-5% non-fat milk, the membranes were incubated with primary antibodies at 4° C. overnight and then the corresponding secondary antibody at RT for 1 h. Images were captured and analyzed using the Odyssey Laser Fluorescence Detection System (LI-COR Biosciences). The band intensities were quantified by ImageStudioLiteVer 5.2 (LI-COR Biosciences). The primary antibodies were: goat anti-NGAL (R&D Systems), rat anti-KIM-1 (R&D Systems), rabbit anti-BMPR1A (Santa Cruz Biotechnology), rabbit anti-αSMA (Abcam), mouse anti-glyceraldehyde 3-phosphate-dehydrogenase (Novus Biologicals), and rabbit anti-β-actin (Cell Signaling Technology).

Quantitative Analysis of Gene Expression

Total tissue RNA was isolated using TRIzol™ reagent (Life Technologies), DNase kit (Invitrogen), and converted into complementary DNA with High-Capacity cDNA Reverse Transcription Kits (Applied Biosystems). Quantitative polymerase chain reaction was performed on a Mx3000P™ system (Agilent Technologies) using primers (Table 1) and SYBR® Select Master Mix (2×) (Applied Biosystems). The expression of each target gene was assayed in duplicate and presented as fold change normalized by that of the endogenous control gene, gapdh expression.

TABLE 1

Primers for quantitative polymerase chain reaction

| Gene | Forward (5' to 3') | Reverse (5' to 3') |
|---|---|---|
| ccl20 | GCCTCTCGTACATACAGACGC (SEQ ID NO: 1) | CCAGTTCTGCTTTGGATCAGC (SEQ ID NO: 2) |
| cdkn1a | TAGGACTCAACCGTAATATCCCGAC (SEQ ID NO: 3) | AAGAGCAGCAGATCACCAGATTAAC (SEQ ID NO: 4) |
| col1a1 | GGTATGCTTGATCTGTATCTGCCAC (SEQ ID NO: 5) | CCTCGACTCCTACATCTTCTGAGTT (SEQ ID NO: 6) |
| fsp1 | ACTTGGACAGCAACAGGGACA (SEQ ID NO: 7) | GGGCTCCTTATCTGGGCAGC (SEQ ID NO: 8) |
| gapdh | GTCAAGCTCATTTCCTGGTATGACAA (SEQ ID NO: 9) | GGATAGGGCCTCTCTTGCTAGT (SEQ ID NO: 10) |
| icam | GTGATGCTCAGGTATCCATCCA (SEQ ID NO: 11) | CACAGTTCTCAAAGCACAGCG (SEQ ID NO: 12) |
| ki67 | CTGGTTGTTACTGAAGAGCCCATAC (SEQ ID NO: 13) | CTTAACTGTCCTTGGTTGGTTCCTC (SEQ ID NO: 14) |

TABLE 1-continued

Primers for quantitative polymerase chain reaction

Primer (5' to 3')

| Gene | Forward | Reverse |
| --- | --- | --- |
| kim1 | AAACCAGAGATTCCCACACG (SEQ ID NO: 15) | GTCGTGGGTCTTCCTGTAGC (SEQ ID NO: 16) |
| lox | CCACAGCATGGACGAATTCA (SEQ ID NO: 17) | AGCTTGCTTTGTGGCCTTCA (SEQ ID NO: 18) |
| lox12 | GATCTTCAGCCCCGATGGA (SEQ ID NO: 19) | CAAGGGTTGCTCTGGCTTGT (SEQ ID NO: 20) |
| nfkb | GGAGGCATGTTCGGTAGTGG (SEQ ID NO: 21) | CCCTGCGTTGGATTTCGTG (SEQ ID NO: 22) |
| plod2 | GATGTTCGTTTCTGGTGGAAATTGG (SEQ ID NO: 23) | TAAAGCAGAAAGACATGAGCTTCCC (SEQ ID NO: 24) |
| traft1 | CACTGCCAAGTATGGTTACAAGT (SEQ ID NO: 25) | GGTTGTTCTGGTCAAGTAGCAT (SEQ ID NO: 26) |
| traft2 | TTCGGCCTTTCCAGATAACGC (SEQ ID NO: 27) | ACTCCGTCAGCAGGAATGGGC (SEQ ID NO: 28) |

Immunofluorescence Staining and Immunohistochemistry

The left kidney was flushed with 10 mL ice-cold PBS, 10 mL 10% formalin through the left ventricle immediately after euthanasia, and the kidney was collected. For immunofluorescence staining, half of the kidney was fixed in 10% formalin for 2 h on ice, incubated in 30% (vol/vol) sucrose at 4° C. overnight, snap frozen in OCT (Sakura FineTek), and cut into 7-μm sections. Sections were treated with heated citrate (Antigen Unmasking Solution, Vector Laboratories), blocked in 10% (vol/vol) normal goat serum (Vector Laboratories) in 0.3M glycine-PBST for 1 h RT, incubated with primary antibodies at 4° C. overnight, and then corresponding secondary antibodies (Jackson ImmunoResearch) in PBS containing 10% of the blocking solution for 1 h RT. Stained sections were mounted in mounting Medium with DAPI (Vectashield H-1000, Vector Laboratories), and stored at −20° C. until observed under confocal microscopy (Fluoview 1000, Olympus). Three washes with PBST were performed between each step. The primary antibodies were: goat anti-ICAM (R&D Systems), rabbit anti-Col1 (Novus Biologicals), rabbit anti-fibronectin (Abcam), rabbit anti-vimentin (Abcam), rat anti-F4/80 (Abcam), rabbit anti-iNOS (Abcam), and phalloidin (Thermo Fisher Scientific) was used for staining of the brush-boarder. For immunohistochemistry analysis, the infused kidney was fixed in 10% formalin at 4° C. overnight, embedded in paraffin, and cut into 5-μm sections. Hematoxylin & eosin and Masson's trichrome stain were performed. Semiquantitative renal histology injury scoring was assessed by an investigator blinded to group assignment and the percentage of fibrosis per area was quantified using ImageJ (https://imagej.nih.gov/ij/; National Institutes of Health).

Statistical Analysis

Graph and statistical analyses were performed using GraphPad Prism 8 (GraphPad Software). Numerical data are presented as mean±standard deviation. Tukey's test was used to determine significance of differences among multiple groups and t test between two groups; survival rates were analyzed using log-rank Mantel-Cox test. $P<0.05$ was considered statistically significant.

Abbreviations

Alpha-smooth muscle actin (α-SMA); Bone morphogenetic protein receptor type 1A (BMPR1A); Cecal ligation and puncture (CLP); Chronic kidney disease (CKD); Collagen type I (Col-1); Histone deacetylase inhibitors (HDIs); Inducible nitric oxide synthase (iNOS); Insulin-like growth factor-binding protein 7 (IGFBP7); Intercellular adhesion molecule-1 (ICAM-1); Interleukin 6 (IL-6); Kidney injury molecule-1 (KIM-1); Mannose receptor (MR); Mononuclear cells (MNC); Neutrophil gelatinase-associated lipocalin (NGAL); Phenylthiobutanoic acids (PTBAs); and Sepsis associated with acute kidney injury (S-AKI).

Results

S-AKI Develops into a Chronic Kidney Disease (CKD)-Like Phenotype

Aged Balb/c mice (20-24 weeks old, both male and female) were subjected to cecal ligation and puncture (CLP) surgery and followed for 14 days for survival and signs of maladaptive repair in the kidneys. Renal expression of intercellular adhesion molecule (ICAM-1) and collagen type I (Col1) were examined at 6 hours, 24 hours and 14 days by immune staining. Images show increased stain intensities for ICAM-1 and Col1 at day 14 comparing to earlier time points. The quantified intensities for group animals are significantly increased on day 14 (ICAM-1: 14 d 274.6±115.2 vs. sham 74.9±13.9, $P<0.0001$; Col1: 14 d 836.5±158.4 vs. sham 59.8±11.5, $P<0.0001$, FIGS. 1A and 1B), suggesting activated renal inflammation and collagen synthesis. Consistently, kidney tissue homogenate western blots and the corresponding kidney injury molecule-1 (KIM-1) and bone morphogenetic protein receptor type 1A (BMPR1A) also show increased protein expression on day 14 relative (KIM-1/GAPDH: 14 d 0.65±0.32 vs. 24 h 0.24±0.13, $P=0.27$; BMPR1/GAPDH: 14 d 1.0±0.01 vs. 24 h 0.3±0.01, $P<0.001$); whereas alpha-smooth muscle actin (αSMA) transiently peaked around 6~24 hours and subsided thereafter (αSMA/GAPDH: 24 h 0.13±0.02 vs. 6 h 0.08±0.01, $P<0.05$; 14 d 0.04±0.01 vs. 24 h 0.13±0.02, $P<0.01$) (FIGS. 1C and 1D). These findings are indicative of maladaptive repair, a CKD-like phenotype, post-AKI.

Figure 2A:
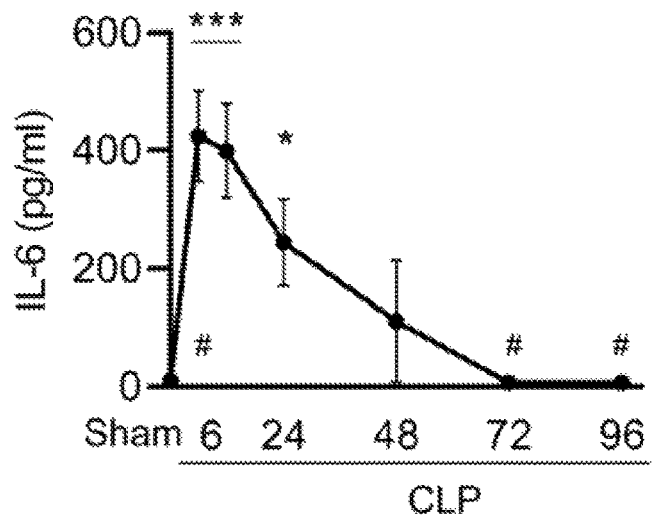
FIGS. 2A-2F. Treatment Window Determination of treatment timing based on resolution of renal dysfunction and systemic inflammation. Time serial samples were obtained at 6-96 hours after the initial insult.
Figure 2B:
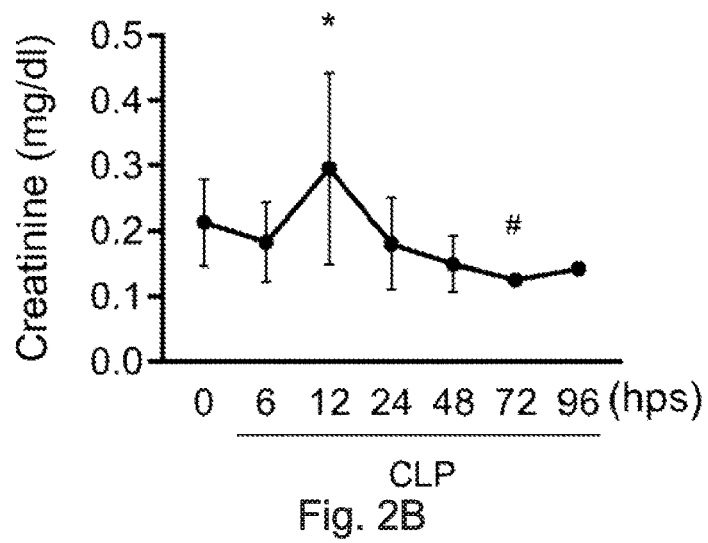
Figure 2C:
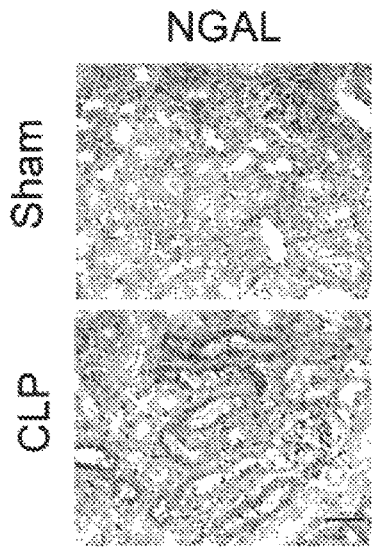
Figure 2D:
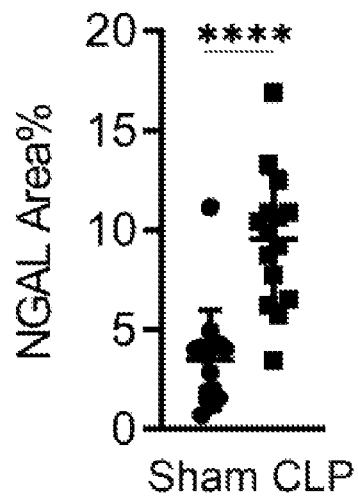
Figure 2E:
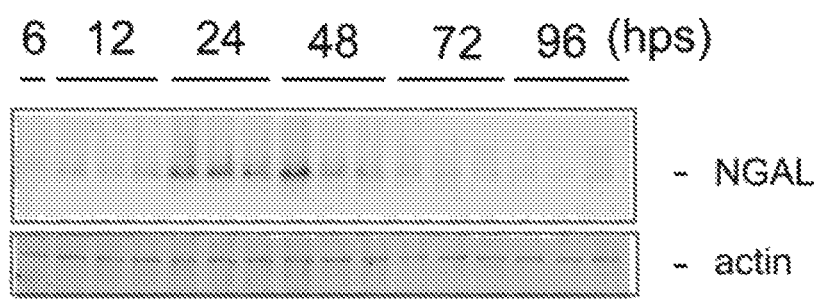
Figure 2E:
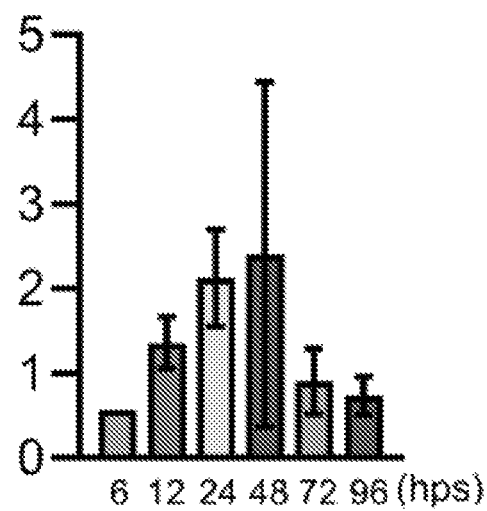
Figure 2F:
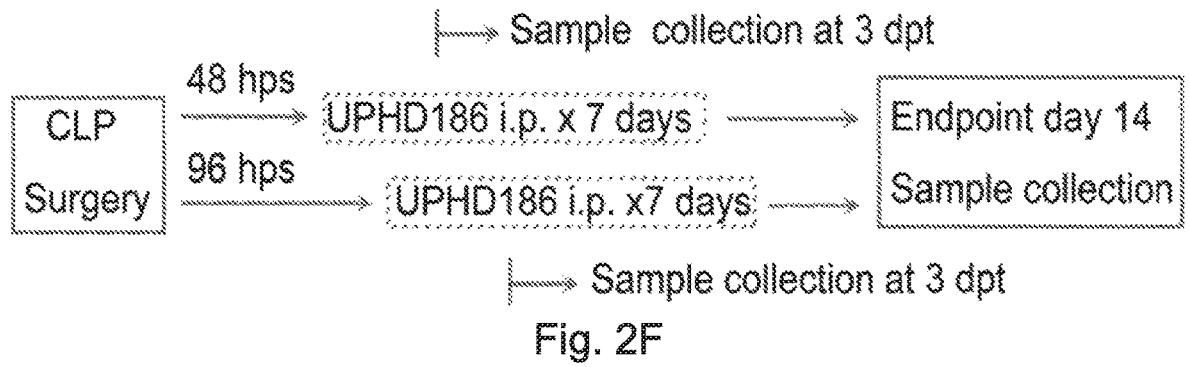

Determination of Treatment Timing Based on Resolution of Inflammation and Kidney Dysfunction To delineate the time-course of S-AKI pathology, serial blood and renal tissue samples were collected over 6-96 hours following initial injury and subjected to cytokine and creatinine assays. The results show that circulating pro-inflammatory cytokines interleukin (IL)-6 and serum creatinine peaked at ~6-12 hours post-CLP and then returned to baseline by 72 hours: IL-6: 72 h 7.8±1.8 vs. 6 h 424.3±76.5 μg/mL, P<0.001; creatinine: 72 h 0.3±0.001 vs. 12 h 0.1±0.2 mg/dl, P<0.05, (FIGS. 2A and 2B). Renal expression of NGAL was increased in CLP (48 h) animals compared to sham and stain intensity analysis across groups shows highly significant differences (CLP vs. sham: 9.5±3.4 vs. 3.5±2.5, P<0.0001, FIGS. 2C and 2D). NGAL peaked at ~24-48 hours (NGAL/actin 96 h 0.7±0.2 vs. 48 h 2.4±2.0, P=0.36, FIG. 2E). All values return to normal by 72 hours. Based on these results, we set time to initiation of treatment at either 48 hours (early treatment) or 96 hours (delayed treatment) post-CLP surgery, before or after the resolution of IL-6, NGAL and return of kidney function. Treatment effects were checked at 3 days post-treatment, and at the CLP-day-14 endpoint (FIG. 2E). FIG. 2F provides a schematic diagram of treatment timing and sample collection plan.

Effects of UPHD186 on Kidney Monocytes and their Phenotype

Figure 3A:
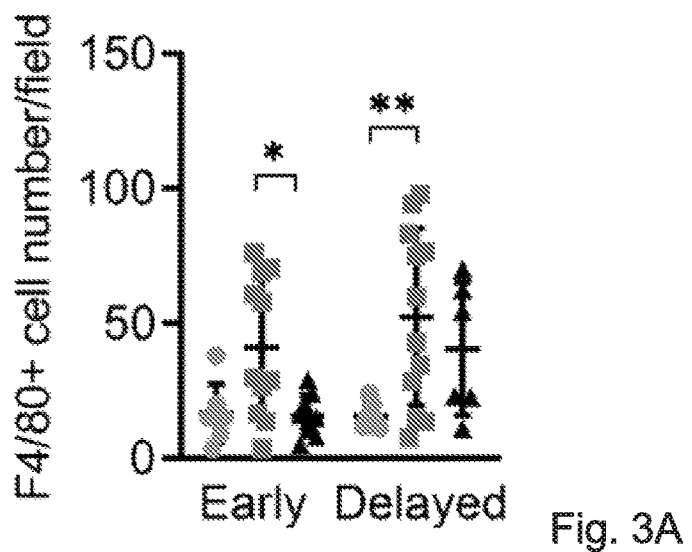
FIGS. 3A-3D. Short-term Effect Treatment effects measured at treatment-day-3. Scale bar=20 µm.
Figure 3B:
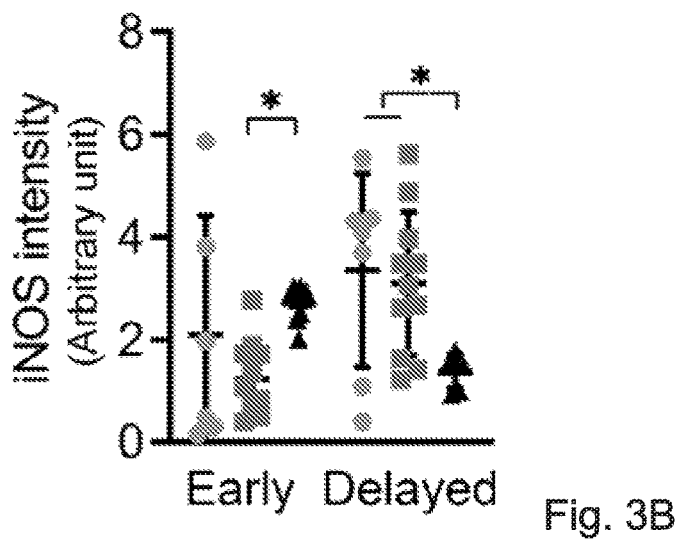
Figure 3C:
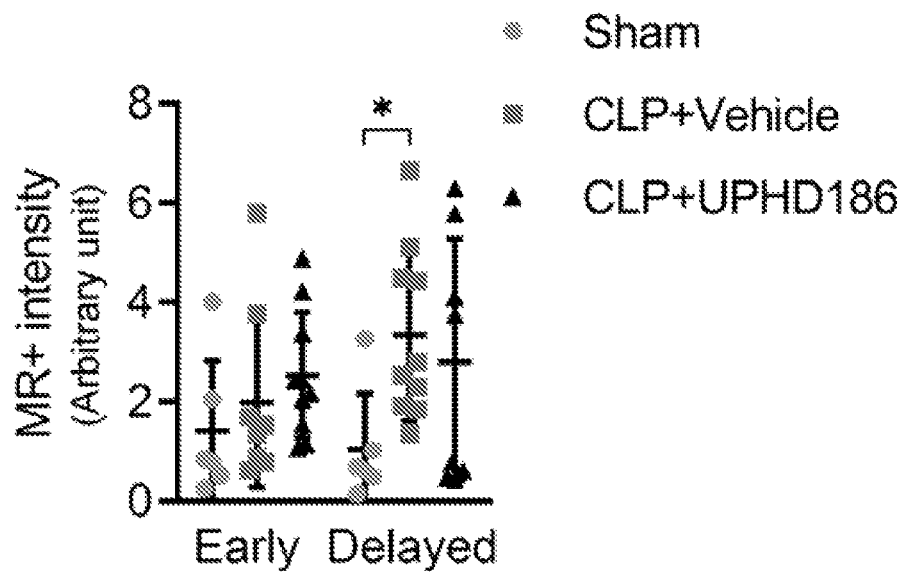

Kidney samples collected at day 3 post-treatment were examined for presence numbers of monocytes in the kidney and their phenotypes (monocytes: F4/80$^+$, M1: F4/80$^+$ iNOS$^+$, M2: F4/80$^+$MR$^+$). Our results show that compared to sham, septic animals had increased numbers of F4/80$^+$ cells in the kidneys (early treatment animals: sham 16.6±10.8 vs. CLP 41.2±26.1 cells/field, P=0.07; delayed treatment animals: sham 15.5±4.8 vs. CLP 52.4±32.9 cells/field, P<0.01). Early treatment with UPHD186 significantly inhibited this increase (15.7±7.7 cells/field, comparing to corresponding CLP, P<0.05), whereas delayed treatment had no significant effect (40.6±24.7 cells/field, P=0.55, FIG. 3A). Interestingly, early and delayed treatment had opposite effects on iNOS expression (a marker of M1 phenotype) compared to CLP vehicle treated animals with the early treatment increasing the expression intensities: 2.7±0.3 vs. CLP 1.2±0.7, P<0.05; delayed treatment decreasing the expression intensities 1.4±0.3 vs. CLP 3.1±1.4, P<0.05) (FIG. 3B). For MR, a marker of M2 phenotype, with its postponed increase seeing in the delayed CLP group (CLP vs. sham: 3.3±1.7 vs. 1.0±1.1, P<0.05), no treatment effects were observed in both groups (FIG. 3C). These results indicated that early treatment may prohibit monocyte infiltration into the kidneys and tip the balance toward M1, whereas delayed treatment does not affect the renal monocyte infiltration and tended to inhibit M1 phenotype transition.

Figure 3D:
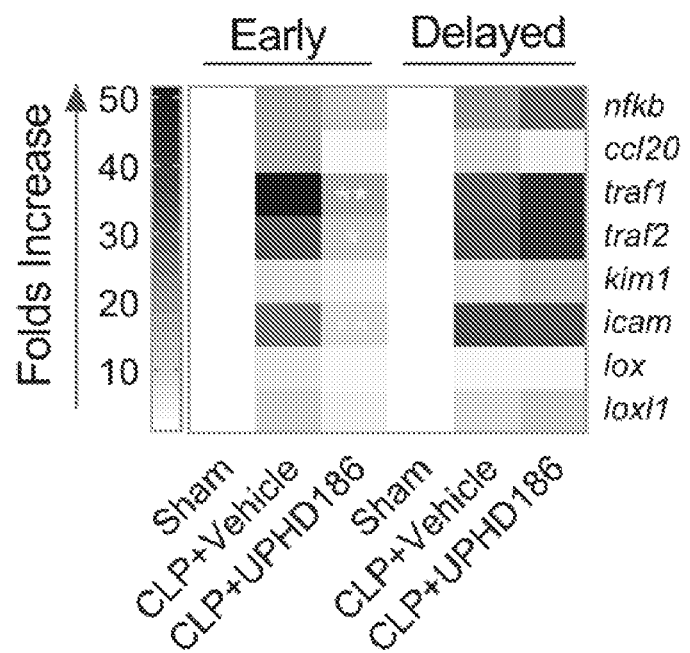
Figure 4:
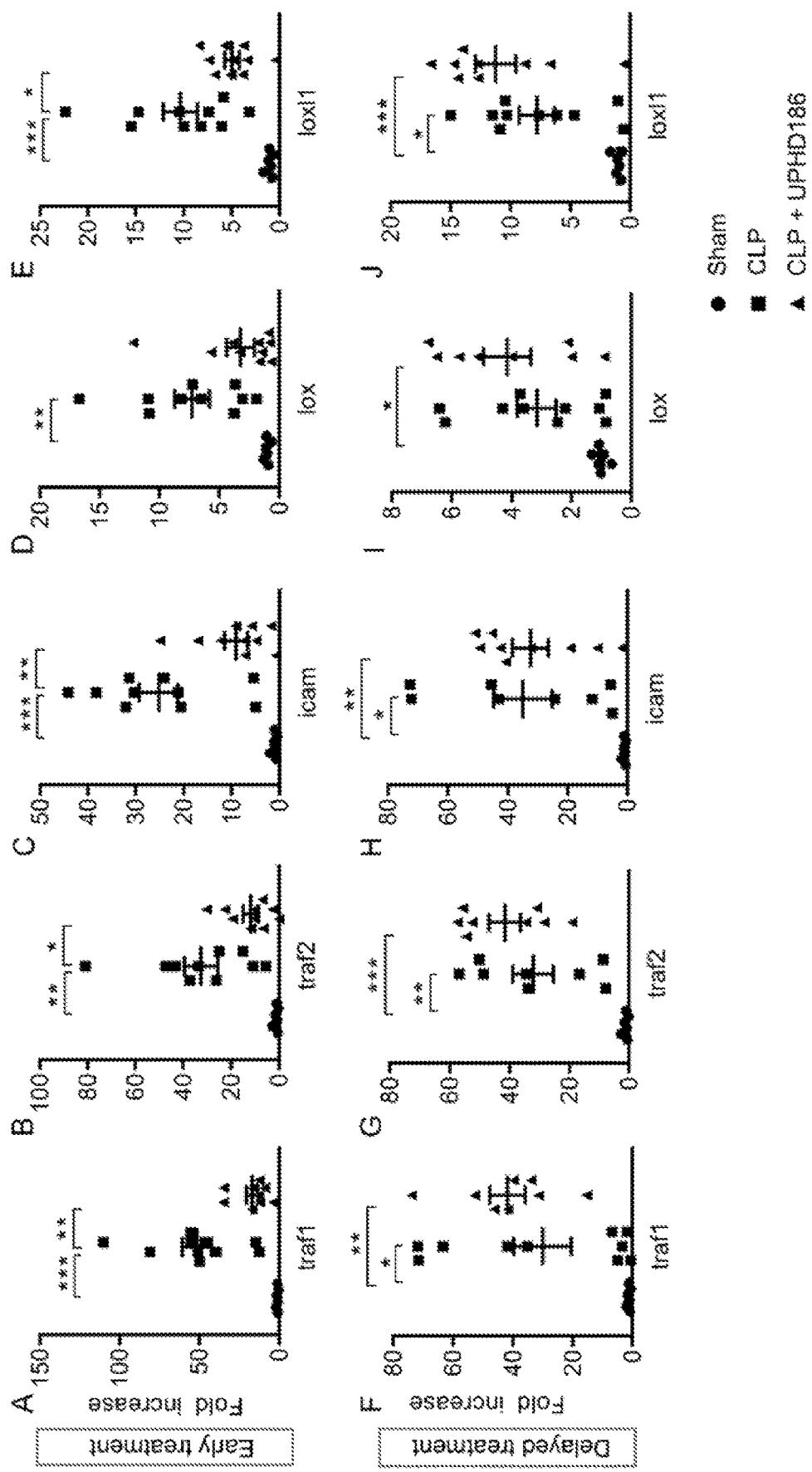
FIG. 4. Inflammation and matrix remodeling markers were different in mRNA levels between sham and CLP. Markers with statistically significant differences between sham and CLP+vehicle at treatment-day-3 are shown. Presented are dot plots with group mean±SD of key mediators involved in inflammation (traf1, traf2, icam) and matrix remodeling (lox, loxl1). N=6~8 for each group. *P<0.05, P<0.01, *P<0.001. Abbreviations: icam, intercellular adhesion molecule; lox, lysyl oxidase; loxl1, lysyl oxidase homolog 1; traf, tumor necrosis factor receptor associated factor.

Effects of UPHD186 on Markers of Inflammatory Gene Expression, Kidney Injury, and Matrix Remodeling Kidney samples were examined at mRNA levels for genes controlling inflammation (nfkb, ccl20, traf1, traf2, icam), kidney injury (kim1), and matrix remodeling markers (lox, loxl1). Septic animals had higher levels of gene expression compared to sham controls (FIG. 4). Early treatment significant inhibited increases in 4 of 8 gene products (fold-increase: traf1: early treatment 17.1±3.6 vs. CLP 51.5±9.1, P<0.01; traf2: 12.2±3.0 vs. 32.5±6.9, P<0.05; icam1: 9.1±2.3 vs. 25.3±4.1, P<0.01; loxl1: 5.0±2.3 vs. 10.5±5.7, P<0.05), whereas delayed treatment had no effect on any marker expressions compared to CLP controls. (FIG. 3D).

Effects on Sepsis Survival, Circulating Creatinine and Cytokines

Figure 5A:
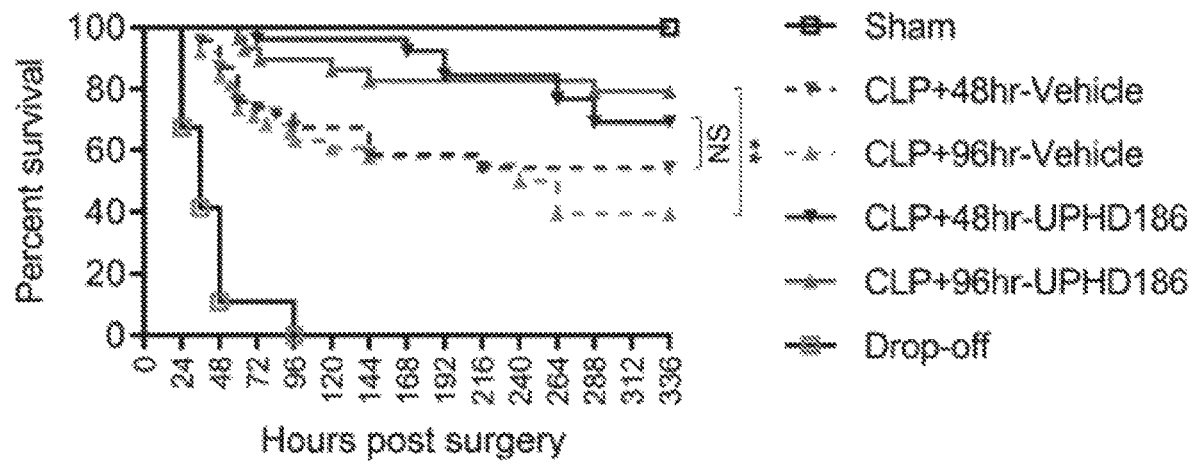
FIGS. 5A-5G. Two-week Outcome Treatment effects at 14-day endpoint comparing early versus delayed treatment effects.
Figure 5B:
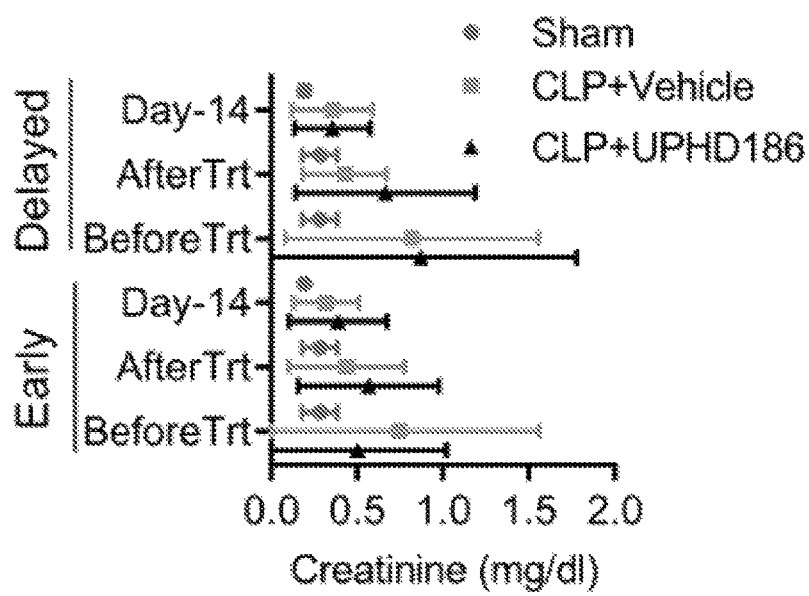
Figure 6:
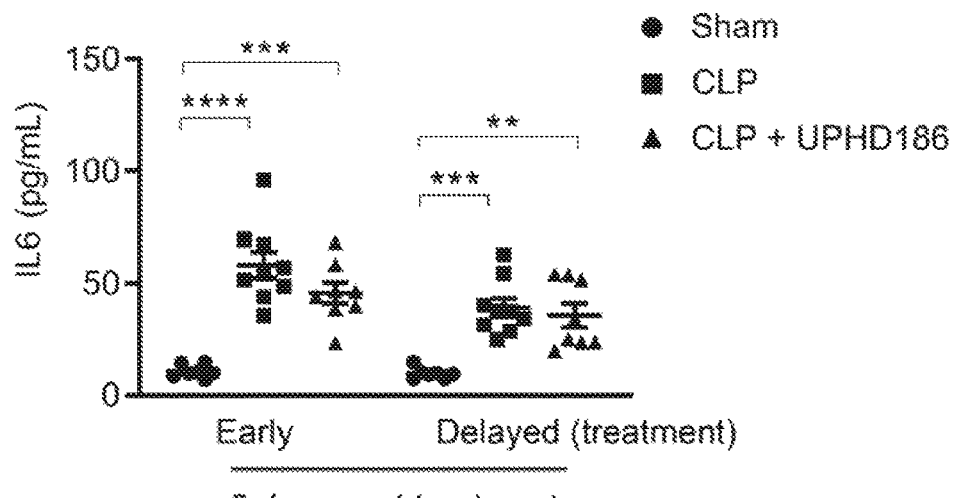
FIG. 6. No significant differences were seen in circulating cytokines between two treatment groups. A. dot plots of interleukin (IL) 6. N=7~9 each group. P<0.01, *P<0.001, ****P<0.0001. Abbreviation: Trt, UPHD186 treatment.

As expected, sepsis animals had lower survival rates by day 14 compared to sham: CLP+vehicle starting at 48 hrs (early) 54%, CLP+vehicle starting at 96 hrs (delayed) 39.0%, sham 100%, P<0.0001 comparing CLPs to sham group. Early treatment did not show beneficial effects (69% vs. 54%, P=0.32), whereas delayed treatment resulted in significantly improved in sepsis survival (79% vs. 39%, P<0.01) (FIG. 5A). However, neither creatinine (FIG. 5B) nor cytokine IL6 (FIG. 6) were affected by the UPHD186 treatment regimens.

Effects on Markers of Cell Cycle Regulation, Proliferation, and Fibrosis

Figure 5C:
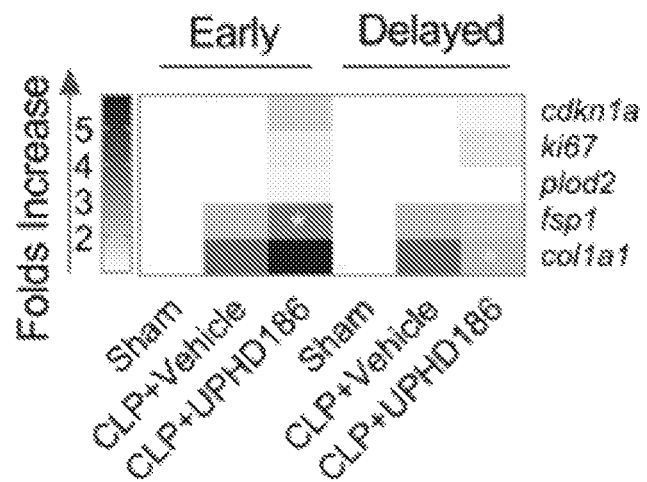
Figure 5D:
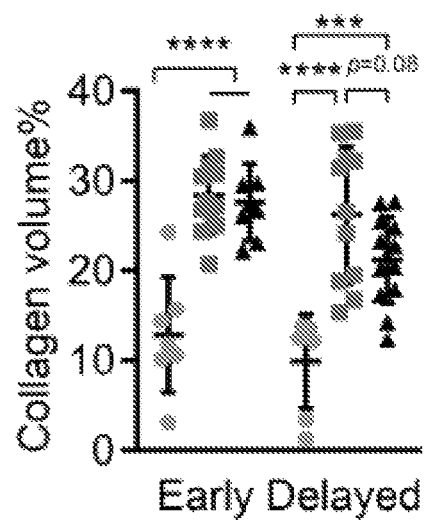
Figure 7:
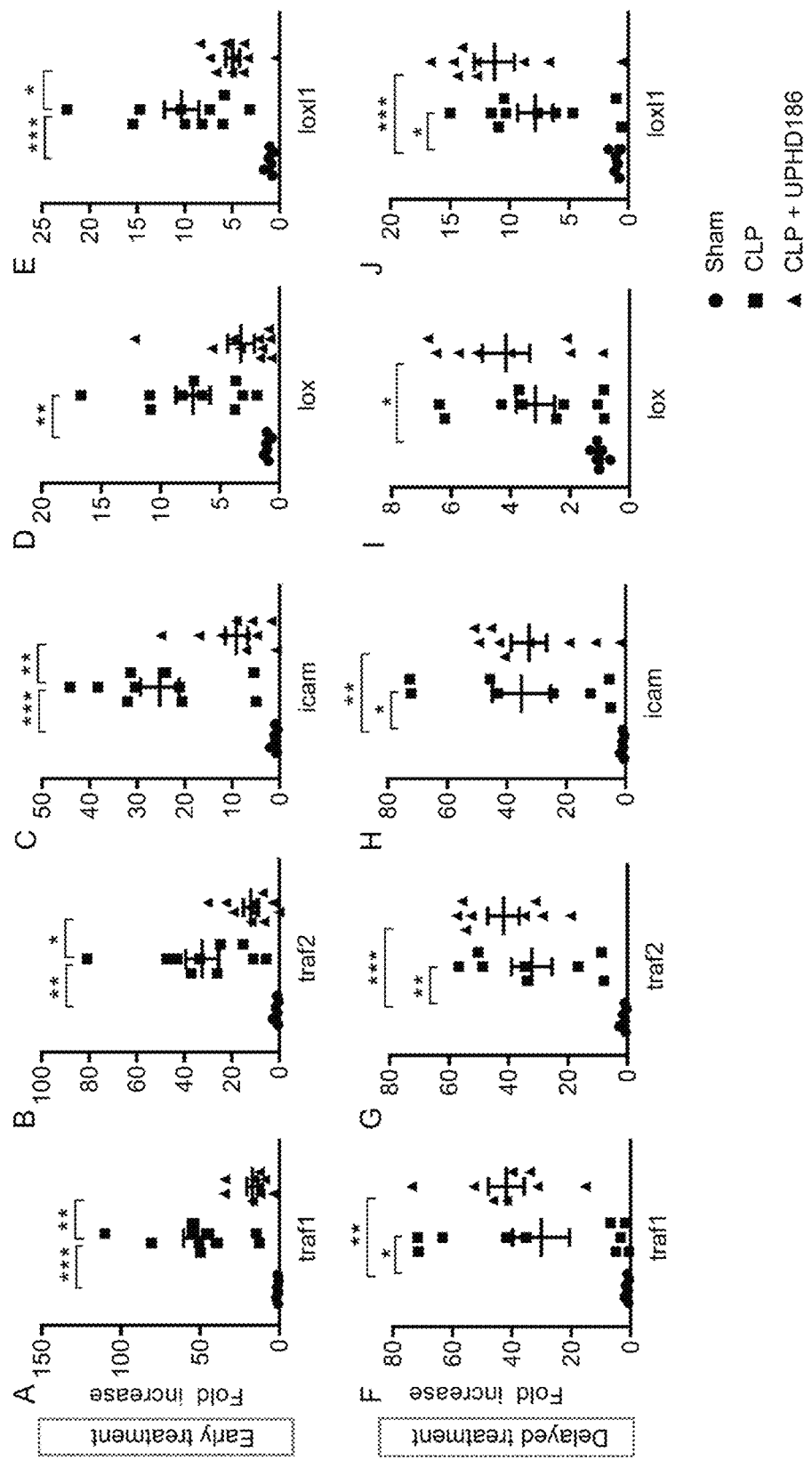
FIG. 7. Cell cycle regulation, proliferation and pro-fibrosis markers were different in mRNA levels between sham and CLP. Significant markers that had statistically significant differences between sham and CLP+vehicle at CLP-day-14 are shown. Presented are dot plots with group mean±SD of key mediators involved in cell cycle arrest (cdkn1a), proliferation (ki67), and fibrosis (col1a1, plod2, fsp1). N=9~12 for each group. *P<0.05, P<0.01, *P<0.001, ****P<0.0001. Abbreviations: cdkn1a, cyclin-dependent kinase inhibitor 1a; col1a1, collagen type I alpha 1 chain; fsp1, fibroblast-specific protein 1; ki67, Ki-67; plod2, procollagen-lysine, 2-oxoglutarate 5-dioxygenase 2.

Kidney samples on day 14 (following CLP) were examined for mRNA levels for treatment effects on cell cycle regulation (cdkn1a), proliferation (ki67), and pro-fibrosis genes (plod2, fsp1, col1a1). Septic animals had higher levels of fsp1 and col1a1 expressions compared to sham controls (FIG. 7). Early treatment with UPHD186 further increased fsp1 (fold-increase, 3.3±1.3 vs. corresponding CLP+vehicle controls 2.2±1.1, P<0.05), whereas delayed treatment promoted ki67 and inhibited col1a1 expression (fold-increase, ki67: 1.6±0.7 vs. corresponding controls 1.0±0.5, P<0.01; col1a1, 2.2±0.9 vs. 3.7±2.4, P<0.05) (FIG. 5C). Thus, pro-fibrotic gene expression was increased in the recovery phase and early treatment further aggravated these changes; whereas delayed treatment promoted proliferation and attenuated fibrosis.

Figure 5E:
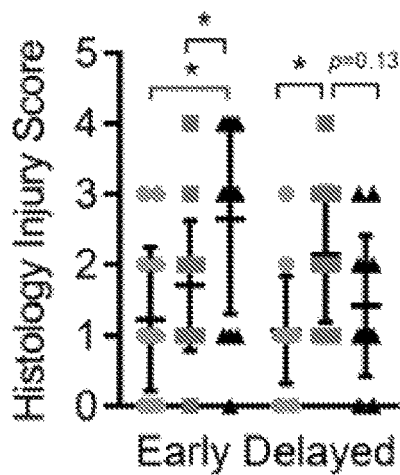

Delayed Treatment with UPHD186 Decreased Tissue Collagen Volume and Reduced Fibrosis At day 14 following CLP, renal Masson's trichrome staining showed patchy collagen fibers in renal interstitium; hematoxylin and eosin staining displayed signs of tissue destruction, including disrupted renal cell arrangement and epithelial cell nuclei-plasma dissociation; cast formation and tubule dilation. Collagen volume fraction and renal histology injury score were higher in septic animals compared to sham controls: collagen volume fraction %: early treated group: CLP 28.43±4.3 vs. sham 12.9±6.4, P<0.0001; delay treated group: 26.2±7.6 vs. 9.9±5.2, P<0.0001; histology injury score: early treated group: CLP 1.7±0.9 vs. sham 1.2±1.0, P=0.4; delay treated group: 2.1±0.9 vs. 1.0±0.8, P<0.05. Whereas early treatment had no effects on fibrosis (collagen volume: 27.6±4.3 vs. 28.4±4.3, P>0.05), the treatment aggravated histology injury (2.6±1.3 vs. 1.7±0.9, P<0.05). Delayed treatment tended to decreased collagen volume (collagen volume fraction %: 21.2±4.8 vs. vehicle 26.2±7.6, P=0.08) and reduced histologic injury (histology injury score: 1.4±1.0 vs. vehicle 2.1±1.0, P=0.13) (FIGS. 54D and 5E). Taken together, these results are consistent with mRNA measurement, confirmed the effects of delayed treatment on reducing tissue injury and inhibiting fibrosis.

Figure 5F:
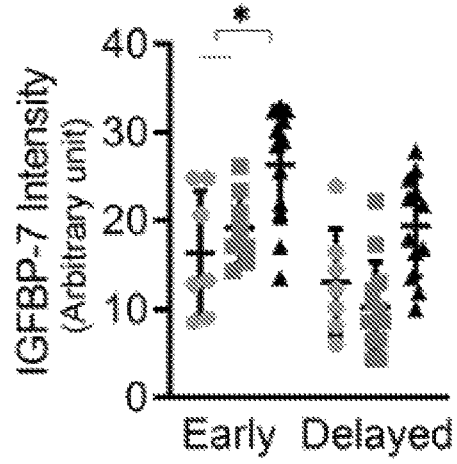
Figure 5G:
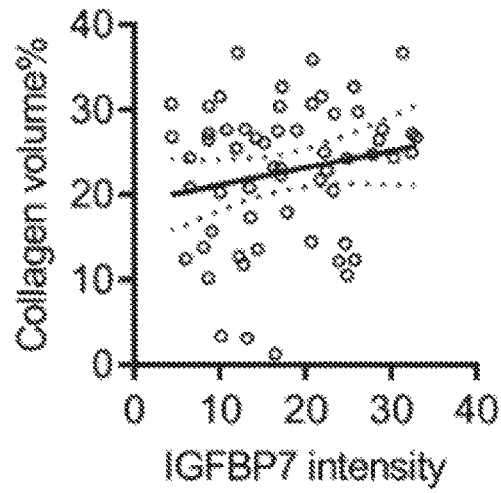

Renal expression/location of the kidney stress marker insulin-like growth factor-binding protein 7 (IGFBP7) was measured at Day-14 kidneys. In septic animals, IGFBP7 protein expression was anatomically displaced with higher-level staining appearing in the tubule lumen compared to sham controls. Although neither treatment regimens changed the secretory pattern of IGFBP7 (data not show), early treatment significantly increased the overall IGFBP7 renal expression (early treated 674.1±190.5 vs. CLP 396.9±109.0, P<0.05), whereas delayed treatment had no such effect (FIG. 5F). Linear regression analysis of correlated IGFBP7 with collagen volume % indicating a positive association between these two indicators but not achieving statistical significance p=0.15 (FIG. 5G).

Discussion

Here we report the characteristics of a model of S-AKI in mice that develops into a pro-fibrotic, CKD-like phenotype (FIG. 1). Our model includes antibiotics and fluid resuscitation and is carefully titrated to be "just severe enough" to cause significant AKI and yet allow for sufficient survival. In this model, serum creatinine, the clinical manifestation of AKI and circulating cytokine levels were transiently increased with all indicators returning to normal within 72 hours (FIGS. 2A and 2D). Yet underlying cellular pathophysiological processes, increased fibrosis gene expression, interstitial collagen deposition, and injury marker expression in the kidney were documented and were found associated with increased mortality (FIGS. 3D, 5A, and 5C-5E).

We hypothesized a time-dependency of drug efficacy in S-AKI and sought to test its effects when given either before or after the IL-6 had subsided. Treatment effects were examined at two time points during and after resolution of kidney inflammation, included monocyte biology, inflammatory marker expressions on the third day of therapy, as well as cellular events and fibrosis at day-14. Because the two drug regimens (starting from 48 h versus 96 h post the CLP) were applied to different animals-those in the late group had to survive 48 h longer before treatment, comparisons of treatment efficacy can only be performed with the corresponding vehicle group initiated at the same time point, but not across the two treatment strategies.

Our results show a positive treatment impact on sepsis survival with delayed administration of UPHD186, together with increased indicators of tissue proliferation and reduced fibrosis. Serum creatinine and cytokines were insensitive to these pathological features—consistent with clinical observations. Maladaptive repair and fibrosis are important mechanisms leading to CKD, apparently across AKI syndromes. Patients with sepsis-associated AKI may recover kidney function early but still have reduced kidney function on hospital discharge leading to dramatically reduced long-term survival. Currently no effective treatment is available to prevent this progression and thus models of AKI that develop into CKD in sepsis aid to the understanding of the underlying mechanisms and to develop therapies.

F4/80$^+$ mononuclear cells (MNC) including macrophages and dendritic cells, function as phagocytes and antigen-presenting cells initiating immune responses. Depending on the tissue environment, these cells are highly plastic, exhibiting a broad spectrum of phenotypes, the most studied of which are the two polarized extremes, classically activated macrophages (M1) and alternatively activated macrophages (M2). The phenotypes of the infiltrated MNC contribute substantially to local immune regulation in either inflammatory or anti-inflammatory processes, closely associated with renal injury and repair. Increased F4/80$^+$ cells exhibiting a dominate M1-phenotype contribute to inflammation and leukocyte recruitment in the acute phases of kidney injury. By contrast F4/80$^+$ cells exhibiting an M2 phenotype play critical roles in healing and tissue regeneration during the recovery phase. Our results show that, when UPHD186 is given to septic animals prior to the resolution of inflammation, decreased numbers of F4/80$^+$ cells were present in the kidneys while percentages of pro-inflammatory M1 cells increased. By contrast, delaying treatment until inflammation had resolved (at least by IL-6) had no effect on the total renal F4/80$^+$ cell numbers with decreased iNOS but increased MR expression (FIG. 3A-3C), thus, shifting the fraction of pro-inflammatory F4/80$^+$iNOS$^+$ downward and favoring an M2 phenotype. The novelty of this report is that MNC could be driven to transform to pro- or anti-inflammatory phenotypes, depending on the timing of HDI administration.

As readouts for S-AKI day-14 outcome, we found increased renal expression of markers which mediate inflammation (ICAM-1) injury (KIM-1), and collagen synthesis (collagen 1) (FIG. 1A-1D, 5D). Notably, these signals were present in the kidneys following CLP even though serum creatinine and systemic inflammation marker IL-6 had returned to normal by 72 hours. Furthermore, these changes were concurrent with maladaptive repair signs of histology impairment and fibrosis (FIG. 4D-F). Increased renal expression of both ICAM-1 and KIM-1 by day 14 represents ongoing injury in the kidney. With the renal interstitium considered as a distinct compartment, systemic inflammatory activation may not necessarily reflect the status in the kidney and vice versa. ICAM-1 promotes trafficking of inflammatory cells and is considered a major mediator of tissue injury. In a chronic phase following AKI, epithelial cells that express KIM-1 are found in regions of unresolved injury and thus may demarcate areas of "unresolved injury/repair" in the epithelium. Early treatment with UPHD186 showed wide-spread inhibition on inflammation marker mRNA expression (FIG. 3D). However, these effects unexpectedly worsened the S-AKI (histologic damage and fibrosis). Without intention to be bound, this may have occurred through prematurely down-regulating host defenses through inhibiting inflammatory reaction in response to pathogens, or by forcing those cells to cell cycle marked by increased cdkn1a (FIG. 5C), which were still coping with inflammation and not ready for regeneration. On the other hand, the beneficial effect of delayed treatment could either come from direct inhibition of collagen synthesis, fibroblast proliferation or activation or, indirect effects through modulating MNC phenotypes. These results illustrate the remarkable complexity of S-AKI with effects of treatment dependent on the pathological status at the time of intervention.

We also found IGFBP7 protein, a marker of acute kidney epithelial cell stress, was secreted into the tubular lumen in response to sepsis. The presence of secreted IGFBP7 is thought to be a manifestation of the tubular cell "secretory phenotype" that is indicative of a cell-cycle-arrest event upon injury. Consistently, clinical AKI biomarker studies have found increased urinary IGFBP7, together with tissue inhibitor of metalloproteinases-2, associated with a higher incidence of AKI compared to controls. Furthermore, these markers have been shown to predict long-term adverse outcomes (death or dialysis) when followed by clinical evidence of AKI. Thus, persistent elevation of IGFBP7 likely indicates ongoing stress and may lead to maladaptive repair. Although we have previously shown upregulation of IGFBP7 in zebrafish and in isolated human kidney cells in response to various insults, this is the first experimental study to show that renal expression of IGFBP7 is associated with subsequent renal fibrosis. A possible role for this molecule is as a mediator in the TGF-β1 signaling pathway, and it may play a key role in regulating cell migration and proliferation and increasing susceptibility of cells to apoptotic signals.

Example 2

Figure 8:
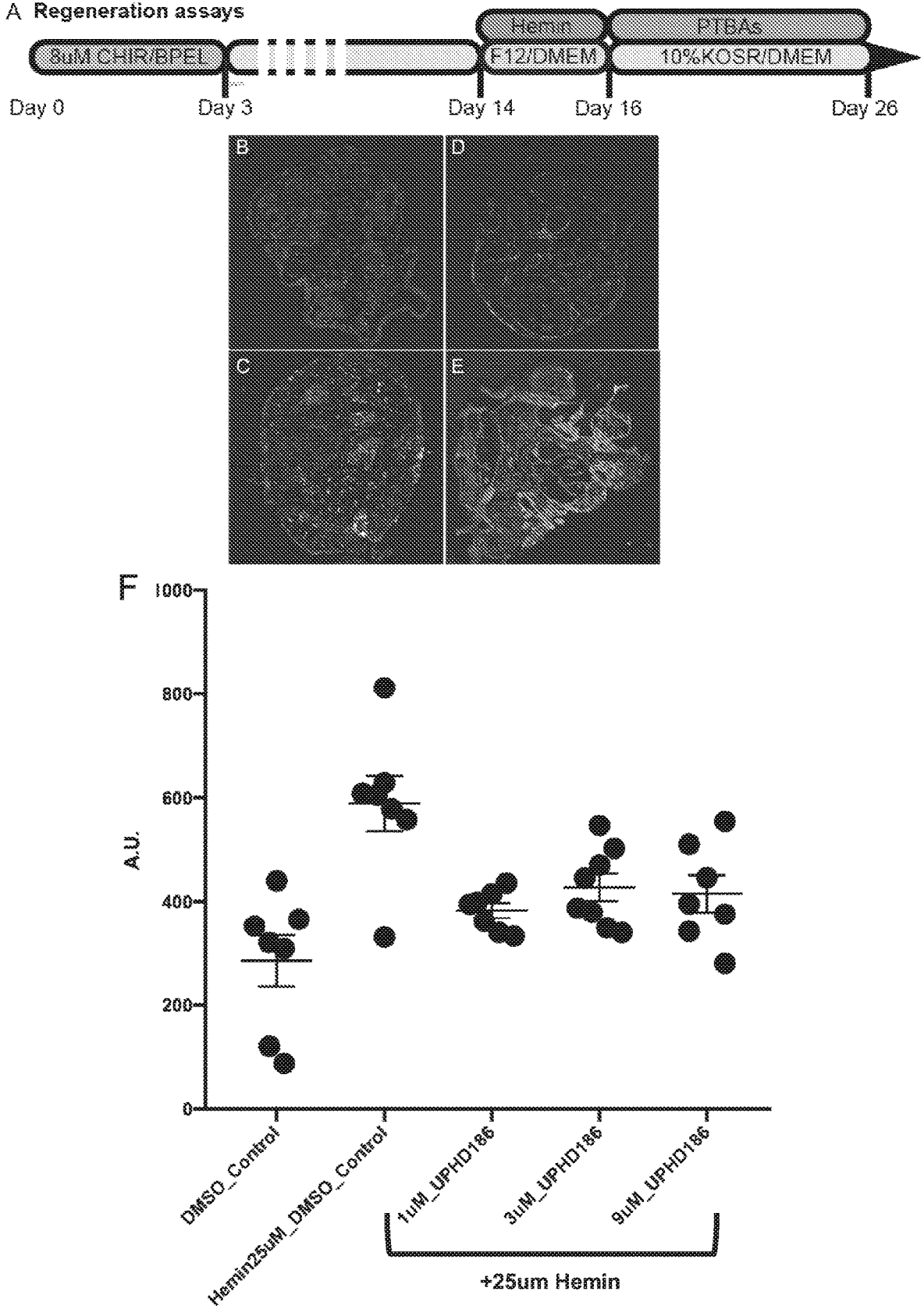
FIG. 8. Organoids treated with hemin for 48 hrs show signs of injury. (A) Treatment scheme, (B, C) 3-Nitrotyrosine staining (Biomarker for excessive ROS and NOS in control (B) and hemin treated (C) organoids; (D, E) Collagen hybridizing peptide (CHP) staining in control (D) and hemin treated (E) organoids; (F) Collagen peptide-Cy3 (CHP) quantification in hemin organoids treated with UPHD186.

A simple bioreactor-based method for growing renal organoids for long periods of time is provided, resulting in tissue with a high degree of maturation. Hemin-induced acute kidney injury produced by the oxidation of the heme of hemoglobin and myoglobin, causing oxidative stress and inflammation. Referring to FIG. 8 (A-F), using the hemin model, we have demonstrated that UPHD25 (data not shown) and UPHD186 treatment after the injury reduces collagen deposition (fibrosis) (FIG. 1 (F)). These observations indicate that the kidney organoid model of AKI provides a valuable new platform to validate novel compounds in the setting of human AKI.

Organoids were prepared essentially as described in Przepiorski A, Sander V, Tran T, Hollywood J A, Sorrenson B, Shih J H, Wolvetang E J, McMahon A P, Holm™ and Davidson A J. A Simple Bioreactor-Based Method to Generate Kidney Organoids from Pluripotent Stem Cells. Stem Cell Reports. 2018; 11:470-484. As shown in FIG. 8 (A), induced pluripotent stem cells (iPSCs) were cultured for three 3 days in with 8 µM of the Wnt agonist CHIR-99021 (CHIR, e.g., 6-[[2-[[4-(2,4-dichlorophenyl)-5-(5-methyl-1H-imidazol-2-yl)-2-pyrimidinyl]amino]ethyl] amino]-3-pyridinecarbonitrile) in BPEL (BSA poly(vinyl alcohol) essential lipids)), and were then cultured for an additional 11 days in DMEM with Knockout™ Serum Replacement (KOSR). At 14 days, DMEM F12 medium containing 25 µM Hemin (Sigma, H9039) is applied for two days, followed by 10 days with 1 µM, 3 µM, and 9 µM UPHD186 in DMEM with 10% KOSR. UPHD25 was evaluated in the same manner. FIG. 8 (B, C, original in color), show 3-Nitrotyrosine staining (a biomarker for excessive ROS and NOS) in control (B) and hemin-treated (C) organoids. FIG. 8 (D, E, originals in color) show Collagen Hybridizing Peptide (CHP) staining in control (D) and hemin treated (E) organoids. FIG. 8 (F) shows collagen peptide-Cy3 (CHP) quantification in hemin organoids treated with UPHD186. Collagen, and therefore fibrosis, is reduced in UPHD186-treated organoids, with reduction of collagen also being seen with the administration of UPHD25 (data not shown).

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of treating a sepsis-induced kidney injury in a patient, comprising administering to the patient an amount of a selective histone deacetylase inhibitor effective to treat a sepsis-induced kidney injury in a patient, beginning after initial inflammation following an insult leading to the sepsis has decreased, and prior to development of irreversible fibrosis in the kidney.

2. The method of claim 1, wherein the histone deacetylase inhibitor is administered starting from 96 hours to one week after the insult leading to the sepsis.

3. The method of claim 1, wherein the selective histone deacetylase inhibitor is N-(2-hydroxyphenyl)-4-(phenylsulfanyl) butanamide (UPHD-186).

4. The method of claim 1, wherein the selective histone deacetylase inhibitor is methyl 4-(phenylsulfanyl) butanoate (UPHD-25).

5. The method of claim 1, wherein the selective histone deacetylase inhibitor is 4-[(4-fluorophenyl) sulfanyl]-N-hydroxybutanamide (UPHD-29), N-hydroxy-4-[(4-methylphenyl) sulfanyl] butanamide (UPHD-28), 5-[(4-fluorophenyl) sulfanyl]-N-hydroxypentanamide (UPHD-34), 6-[(4-fluorophenyl) sulfanyl]-N-hydroxyhexanamide (UPHD-51), 4-{2[(4-fluorophenyl) sulfanyl] ethyl}-N-hydroxybenzamide (UPHD-67), methyl 4-[(4-fluorophenyl) sulfanyl] butanoate (UPHD-30), methyl 4-[(4-methoxyphenyl) sulfanyl] butanoate (UPHD-22), methyl 6-(phenylsulfanyl) hexanoate (UPHD-47), methyl 6-[(4-fluorophenyl) sulfanyl] hexanoate (UPHD-48), N-(2-aminophenyl)-6-(phenylsulfanyl) hexanamide (UPHD-49), N-(2-aminophenyl)-6-[(4-fluorphenyl) sulfanyl] hexanamide (UPHD-53), 6-[(4-fluorophenyl) sulfanyl]-N-(2-hydroxyphenyl) hexanamide (UPHD-77), methyl 6-[4-(methylsulfanyl) phenoxy] hexanoate (UPHD-146), methyl 6-(4-methanesulfonylphenoxy) hexanoate (UPHD-149), methyl 4-({5-[(2-hydroxyphenyl) carbamoyl] pentyl} sulfanyl) benzoate (UPHD-150), methyl 4-({5-[(2-aminophenyl) carbamoyl] pentyl} sulfanyl) benzoate (UPHD-151), methyl 3-[(6-methoxy-6-oxohexyl) sulfanyl] benzoate (UPHD-152), methyl 2-[(6-methoxy-6-oxohexyl) sulfanyl] benzoate (UPHD-153), methyl 6-[(3-hydroxyphenyl) sulfanyl] hexanoate (UPHD-154), N-(2-hydroxyphenyl)-6-[4-(methylsulfanyl) phenoxy] hexanamide (UPHD-155), N-(2-aminophenyl)-6-[4-(methylsulfanyl) phenoxy] hexanamide (UPHD-156), methyl 6-[(2-hydroxyphenyl) sulfanyl] hexanoate (UPHD-158), methyl 2-({5-[(2-hydroxyphenyl) carbamoyl] pentyl} sulfanyl) benzoate (UPHD-161), methyl 6-(4-methanesulfinylphenoxy) hexanoate (UPHD-162), methyl]6-[(4-carbamoylphenyl) sulfanyl] hexanoate (UPHD-168), methyl 2-({5-[(2-aminophenyl) carbamoyl] pentyl} sulfanyl) benzoate (UPHD-170), methyl 6-{[4-(methylcarbamoyl) phenyl] sulfanyl} hexanoate (UPHD-171), 6-{[3-(methylcarbamoyl) phenyl] sulfanyl} hexanoate (UPHD-174), 4-({5-[(2-aminophenyl) carbamoyl] pentyl} sulfanyl)-N-methylbenzamide (UPHD-175), 4-({5-[(2-hydroxyphenyl) carbamoyl] pentyl} sulfanyl)-N-methylbenzamide (UPHD-176), methyl 5-(benzylsulfanyl) pentanoate (UPHD-178), methyl 4-[(2-phenylethyl) sulfanyl] butanoate (UPHD-179), methyl 5-{[(4-methoxyphenyl) methyl] sulfanyl} pentanoate (UPHD-180), 3-({5-[(2-(UPHD-181), 3-({5-[(2-hydroxyphenyl) carbamoyl] pentyl} sulfanyl)-N-methylbenzamide aminophenyl) carbamoyl] pentyl} sulfanyl)-N-methylbenzamide (UPHD-185), N-(2-aminophenyl)-5-(benzysulfanyl) pentanamide (UPHD-188), N-(2-aminophenyl)-5-{[(4-methoxyphenyl) methyl] sulfanyl} pentanamide (UPHD-189), N-(2-aminophenyl)-4-[(2-phenylethyl) sulfanyl] butanamide (UPHD-190), 5-(benzylsulfanyl)-N-(2-hydroxyphenyl) pentanamide (UPHD-191), N-(2-hydroxyphenyl)-5-{[(4-methoxyphenyl) methyl] sulfanyl} pentanamide (UPHD-192), N-(2-hydroxyphenyl)-4-[(2-(UPHD-193), N-hydroxy-5-{[(4-phenylethyl) sulfanyl] butanamide methoxyphenyl) methyl] sulfanyl} pentanamide (UPHD-194), 5-(benzylsulfanyl)-N-hydroxypentanamide (UPHD-195), N-hydroxy-4-[(2-phenylethyl) sulfanyl] butanamide (UPHD-196), methyl 6-(4-methanesulfonylbenzenesulfonyl) hexanoate (UPHD-197), N-(3-hydroxy-6-methylpyridin-2-yl)-4-(phenylsulfanyl) butanamide methyl 6-(UPHD-198), [methoxy (phenyl) phosphoryl] hexanoate (UPHD-199), methyl 5-phenylmethanesulfinylpentanoate (UPHD-201), methyl 6 {[2-(methylcarbamoyl) phenyl] sulfanyl} hexanoate (UPHD-202), methyl 4-[methoxy (phenyl) phosphoryl'butanoate (UPHD-203), N-(3-hydroxy-6-methylpyridin-2-yl)-6-(phenylsulfanyl) hexanamide (UPH-D-00204), methyl 5-phenylmethanesulfonylpentanoate (UPHD-206), N-[2-hydroxy-5-(trifluoromethyl) phenyl]-6-(phenylsulfanyl) hexanamide (UPHD-207), methyl 4-[methyl (phenyl) phosphoryl] butanoate (UPHD-208), N-[2-hydroxy-5-(trifluoromethyl) phenyl]-4-(phenylsulfanyl) butanamide (UPHD-209), N-(2-hydroxyphenyl)-6-[methyl (phenyl) phosphoryl] hexanamide (UPHD-210), N-(2-aminopyridin-3-yl)-4-(phenylsulfanyl) butanamide (UPHD-211), N-(4-hydroxypyridin-3-yl)-4-(phenylsulfanyl) butanamide (UPHD-212), N-(2-hydroxypyridin-3-yl)-4-(phenylsulfanyl) butanamide (UPHD-222), N-(3-hydroxypyridin-4-yl)-6-(phenylsulfanyl) hexanamide (UPHD-223), 2-({5-[(2-hydroxyphenyl) carbamoyl] pentyl} sulfanyl)-N-methylbenzamide (UPHD-224), methyl 4-(2-phenylethanesulfinyl) butanoate (UPHD-225), N-(3-aminopyridin-2-yl)-6-(phenylsulfanyl) hexanamide (UPHD-226), N-(3-aminopyridin-2-yl)-4-(phenylsulfanyl) butanamide (UPHD-227), or N-(3-aminopyridin-2-yl)-4-(phenylsulfanyl) butanamide (UPHD-228), or a pharmaceutically acceptable salt of any of the preceding.

6. The method of claim 1, wherein the insult leading to the sepsis is an infection.

7. The method of claim 6, wherein the infection is a hospital-acquired infection.

8. The method of claim 6, wherein the infection is a coronavirus infection.

9. A method of reducing renal fibrosis in a patient having a sepsis-induced acute kidney injury, comprising administering to the patient, prior to development of irreversible fibrosis in the kidney, an amount of a selective histone deacetylase inhibitor effective to treat the sepsis-induced acute kidney injury and reduce fibrosis in the patient.

10. The method of claim 9, wherein the selective histone deacetylase inhibitor is 4-[(4-fluorophenyl) sulfanyl]-N-hydroxybutanamide (UPHD-29), N-hydroxy-4-[(4-methylphenyl) sulfanyl] butanamide (UPHD-28), 5-[(4-fluorophenyl) sulfanyl]-N-hydroxypentanamide (UPHD-34), 6-[(4-fluorophenyl) sulfanyl]-N-hydroxyhexanamide (UPHD-51), 4-{2 [(4-fluorophenyl) sulfanyl] ethyl}-N-hydroxybenzamide (UPHD-67), methyl 4-[(4-fluorophenyl) sulfanyl] butanoate (UPHD-30), methyl 4-[(4-methoxyphenyl) sulfanyl] butanoate (UPHD-22), methyl 6-(phenylsulfanyl) hexanoate (UPHD-47), methyl 6-[(4-fluorophenyl) sulfanyl] hexanoate (UPHD-48), N-(2-aminophenyl)-6-(phenylsulfanyl) hexanamide (UPHD-49), N-(2-aminophenyl)-6-[(4-fluorphenyl) sulfanyl] hexanamide (UPHD-53), 6-[(4-fluorophenyl) sulfanyl]-N-(2-hydroxyphenyl) hexanamide (UPHD-77), methyl 6-[4-(methylsulfanyl) phenoxy] hexanoate (UPHD-146), methyl 6-(4-methanesulfonylphenoxy) hexanoate (UPHD-149), methyl 4-({5-[(2-hydroxyphenyl) carbamoyl] pentyl} sulfanyl) benzoate (UPHD-150), methyl 4-({5-[(2-aminophenyl) carbamoyl] pentyl} sulfanyl) benzoate (UPHD-151), methyl 3-[(6-methoxy-6-oxohexyl) sulfanyl] benzoate (UPHD-152), methyl 2-[(6-methoxy-6-oxohexyl) sulfanyl] benzoate (UPHD-153), methyl 6-[(3-hydroxyphenyl) sulfanyl] hexanoate (UPHD-154), N-(2-hydroxyphenyl)-6-[4-(methylsulfanyl) phenoxy] hexanamide (UPHD-155), N-(2-aminophenyl)-6-[4-(methylsulfanyl) phenoxy] hexanamide (UPHD-156), methyl 6-[(2-hydroxyphenyl) sulfanyl] hexanoate (UPHD-158), methyl 2-({5-[(2-methyl 6-(4-hydroxyphenyl) carbamoyl] pentyl} sulfanyl) benzoate (UPHD-161), methanesulfinylphenoxy) hexanoate (UPHD-162), methy16-[(4-carbamoylphenyl) sulfanyl] hexanoate (UPHD-168), methyl 2-({5-[(2-aminophenyl) carbamoyl] pentyl} sulfanyl) benzoate (UPHD-170), methyl 6-{[4-(methylcarbamoyl) phenyl] sulfanyl} hexanoate (UPHD-171), 6-{[3-(methylcarbamoyl) phenyl] sulfanyl} hexanoate (UPHD-174), 4-({5-[(2-aminophenyl) carbamoyl] pentyl} sulfanyl)-N-methylbenzamide (UPHD-175), 4-({5-[(2-hydroxyphenyl) carbamoyl] pentyl} sulfanyl)-N-methylbenzamide (UPHD-176), methyl 5-(benzylsulfanyl) pentanoate (UPHD-178), methyl 4-[(2-phenylethyl) sulfanyl] butanoate (UPHD-179), methyl 5-{[(4-methoxyphenyl) methyl] sulfanyl} pentanoate (UPHD-180), 3-({5-[(2-hydroxyphenyl) carbamoyl] pentyl} sulfanyl)-N-methylbenzamide (UPHD-181), 3-({5-[(2-(UPHD-185), aminophenyl) carbamoyl] pentyl} sulfanyl)-N-methylbenzamide N-(2-aminophenyl)-5-(benzysulfanyl) pentanamide (UPHD-188), N-(2-aminophenyl)-5-{[(4-methoxyphenyl) methyl] sulfanyl} pentanamide phenylethyl) sulfanyl] butanamide (UPHD-190), 5-(benzylsulfanyl)-N-(2-N-(2-hydroxyphenyl)-5-{[(4-hydroxyphenyl) pentanamide (UPHD-191), (UPHD-189), N-(2-aminophenyl)-4-[(2-methoxyphenyl) methyl] sulfanyl} pentanamide (UPHD-192), N-(2-hydroxyphenyl)-4-[(2-phenylethyl) sulfanyl] butanamide (UPHD-193), N-hydroxy-5-{[(4-methoxyphenyl) methyl] sulfanyl} pentanamide (UPHD-194), 5-(benzylsulfanyl)-N-hydroxypentanamide (UPHD-195), N-hydroxy-4-[(2-phenylethyl) sulfanyl] butanamide (UPHD-196), methyl 6-(4-methanesulfonylbenzenesulfonyl) hexanoate (UPHD-197), N-(3-hydroxy-6-methylpyridin-2-yl)-4-(phenylsulfanyl) butanamide (UPHD-198), methyl 6-[methoxy (phenyl) phosphoryl] hexanoate (UPHD-199), methyl 5-phenylmethanesulfinylpentanoate (UPHD-201), methyl 6 {[2-(methylcarbamoyl) phenyl] sulfanyl} hexanoate (UPHD-202), methyl 4-[methoxy (phenyl) phosphoryl'butanoate (UPHD-203), N-(3-hydroxy-6-methylpyridin-2-yl)-6-(phenylsulfanyl) hexanamide (UPH-D-00204), methyl 5-phenylmethanesulfonylpentanoate (UPHD-206), N-[2-hydroxy-5-(trifluoromethyl)phenyl]-6-(phenylsulfanyl) hexanamide (UPHD-207), methyl 4-[methyl (phenyl) phosphoryl] butanoate (UPHD-208), N-[2-hydroxy-5-(trifluoromethyl)phenyl]-4-(phenylsulfanyl) butanamide (UPHD-209), N-(2-hydroxyphenyl)-6-[methyl (phenyl) phosphoryl] hexanamide (UPHD-210), N-(2-aminopyridin-3-yl)-4-(phenylsulfanyl) butanamide (UPHD-211), N-(4-hydroxypyridin-3-yl)-4-(phenylsulfanyl) butanamide (UPHD-212), N-(2-hydroxypyridin-3-yl)-4-(phenylsulfanyl) butanamide (UPHD-222), N-(3-hydroxypyridin-4-yl)-6-(phenylsulfanyl) hexanamide (UPHD-223), 2-({5-[(2-hydroxyphenyl) carbamoyl] pentyl} sulfanyl)-N-methylbenzamide (UPHD-224), methyl 4-(2-phenylethanesulfinyl) butanoate (UPHD-225), N-(3-aminopyridin-2-yl)-6-(phenylsulfanyl) hexanamide (UPHD-226), N-(3-aminopyridin-2-yl)-4-(phenylsulfanyl) butanamide (UPHD-227), or N-(3-aminopyridin-2-yl)-4-(phenylsulfanyl) butanamide (UPHD-228), or a pharmaceutically acceptable salt of any of the preceding.

11. The method of claim 9, wherein the selective histone deacetylase inhibitor is N-(2-hydroxyphenyl)-4-(phenylsulfanyl) butanamide (UPHD-186).

12. The method of claim 9, wherein the selective histone deacetylase inhibitor is methyl 4-(phenylsulfanyl) butanoate (UPHD-25).

13. The method of claim 9, wherein the sepsis is caused by an insult, and wherein the insult is an infection.

14. The method of claim 13, wherein the infection is a hospital-acquired infection.

15. The method of claim 13, wherein the infection is a coronavirus infection.

\* \* \* \* \*